United States Patent Office 3,766,066
Patented Oct. 16, 1973

3,766,066
GROUPS I AND II METAL-CONTAINING MICELLAR COMPLEXES
Richard Leo McMillen, Painesville, Ohio, assignor to The Lubrizol Corporation, Wickliffe, Ohio
No Drawing. Continuation-in-part of application Ser. No. 5,427, Jan. 23, 1970, now abandoned, which is a continuation-in-part of application Ser. No. 631,195, Apr. 17, 1967, now Patent No. 3,492,231, which is a continuation-in-part of application Ser. No. 612,332, Jan. 30, 1967, now Patent No. 3,384,586, which is a continuation-in-part of application Ser. No. 535,742, Mar. 21, 1966, now abandoned, which is a continuation-in-part of application Ser. No. 185,521, Apr. 6, 1962, now Patent No. 3,242,079. Said application Ser. No. 631,195 being a continuation-in-part of application Ser. No. 580,575, Sept. 20, 1966, now Patent No. 3,376,222, which is a continuation-in-part of applications Ser. No. 323,135, Nov. 12, 1963, now abandoned, and Ser. No. 558,287, June 17, 1966, now Patent No. 3,350,308, both being continuations-in-part of application Ser. No. 309,293, Sept. 16, 1963, now abandoned. Said application Ser. No. 612,332 being a continuation-in-part of applications Ser. No. 369,271, May 21, 1964, and Ser. No. 535,048, Mar. 17, 1966, both now abandoned. Finally, said application Ser. No. 631,195 is also a continuation-in-part of application Ser. No. 535,693, Mar. 21, 1966, now Patent No. 3,372,115, which in turn is a continuation-in-part of said application Ser. No. 185,521. This application Oct. 12, 1971, Ser. No. 188,507

Int. Cl. C-0m $5/16, 5/22, 7/36$
U.S. Cl. 252—32.7 E
11 Claims

ABSTRACT OF THE DISCLOSURE

Solid, Groups I and II metal-containing micellar complexes are prepared by isolating the solid, metal-containing matter from homogenized, overbased organic acids with the aid of such conversion agents as aliphatic carboxylic acids, water, alcohols, phenols, ketones, aldehydes, amines, boron acids, phosphorus acids, oxygen, air, carbon dioxide, and mixtures thereof. The metal-containing compositions are readily and stably dispersed in nonpolar organic liquids. They are useful as additives in plastics, rubbers, paints, caulks, etc., where they function as fillers and thixotropic agents.

REFERENCES TO RELATED APPLICATIONS

This application is a continuation-in-part application of my earlier filed copending application Ser. No. 5,427, filed Jan. 23, 1970, now abandoned; which in turn is a continuation-in-part of my earlier application Ser. No. 631,195, filed Apr. 17, 1967, now U.S. Pat. 3,492,231 (issued Jan. 7, 1970); which in turn is a continuation-in-part of my earlier application Ser. No. 612,332, filed Jan. 30, 1967, now U.S. Pat. 3,384,586 (issued May 21, 1968); which in its turn is a continuation-in-part of my earlier application Ser. No. 535,742, filed Mar. 21, 1966, now abandoned; which in its turn is a continuation-in-part of my earlier filed application Ser. No. 185,521, filed Apr. 6, 1962, now U.S. Pat. 3,242,079 (issued Mar. 22, 1966). The aforementioned U.S. Pat. 3,492,231 is also a continuation-in-part of my earlier filed application Ser. No. 580,575, filed Sept. 20, 1966, now U.S. Pat. 3,376,222 (issued Apr. 2, 1968); when in turn is a continuation-in-part of my earlier filed application Ser. No. 323,135, filed Nov. 12, 1963, now abandoned; and Ser. No. 558,287, filed June 17, 1966, now U.S. Pat. 3,350,308 (issued Oct. 31, 1967); which in their turn are continuations-in-part of my earlier filed application Ser. No. 309,293, filed Sept. 16, 1963, now abandoned. The aforementioned U.S. Pat. 3,384,586 is also a continuation-in-part of my earlier application Ser. No. 369,271, filed May 21, 1964, now abandoned; and Ser. No. 535,048, filed Mar. 17, 1966, now abandoned. Finally, the aforementioned U.S. Pat. 3,492,231 is also a continuation-in-part of my earlier filed Ser. No. 535,693, filed Mar. 21, 1966, now U.S. Pat. 3,372,115 (issued Mar. 5, 1968); which in turn is a continuation-in-part of my earlier noted U.S. Pat. 3,242,079.

This invention relates to solid, metal-containing compositions characterized by the ability to be readily and stably dispersed in nonpolar organic liquids and to processes for preparing these compositions. In particular, the invention concerns isolating solid, metal-containing compositions from non-Newtonian colloidal disperse systems. In another aspect, the invention relates to processes for treating non-Newtonian colloidal disperse systems so as to isolate the desired solid, metal-containing compositions.

In my U.S. Pats. 3,384,586 and 3,492,231, I describe in detail the preparation of non-Newtonian colloidal disperse systems. These non-Newtonian colloidal disperse systems comprise solid, metal-containing colloidal particles predispersed in a liquid dispersing medium and as an essential third component, at least one organic compound which is soluble in said dispersing medium, the molecules of said organic compound being characterized by a hydrophobic portion and at least one polar substituent.

In accordance with the invention claimed in this application, these non-Newtonian colloidal disperse systems are further treated so as to isolate a solid, metal-containing composition therefrom. This solid, metal-containing composition is readily and stably dispersed in polar organic liquids. Furthermore, they can be reduced to powders and added directly to resins, caulks, and the like where they function effectively as fillers and thixotropic agents.

The solid, metal-containing compositions of this invention contain the advantageous properties associated with the non-Newtonian colloidal disperse systems claimed in the above patents while eliminating other problems. For example, it has been found that the presence of the organic liquid dispersing medium in the non-Newtonian colloidal disperse system sometimes interferes with particular uses of the disperse systems as thixotropes and fillers. For example, mineral oil, which is a common dispersing medium for the disperse systems, sometimes migrates to the interface or surface of a resinous composition containing the colloidal disperse system. This interferes with the adherence of coatings and adhesives on the surface or interface. Likewise, economic advantages are associated with the use of the solid, metal, containing compositions. For example, the cost of shipping and storing is reduced. This is true even in those applications where the organic liquid dispersing medium is desirable since, the solid, metal-containing compositions, upon reaching their destination or at the time when they are to be used can easily be reincorporated into a nonpolar organic liquid dispersing medium to regenerate the non-Newtonian colloidal disperse system. The ease with which these solid, metal-containing compositions are readily and stably dispersed within the nonpolar organic liquid diluents makes this regeneration of the non-Newtonian colloidal disperse systems possible. Obviously, the solid, metal-containing compositions of this invention can be employed in the same manner as the non-Newtonian colloidal disperse systems of the above patents.

In accordance with the foregoing, it is a principal object of the invention to provide solid, metal-containing compositions. Another object is to provide solid, metal-containing compositions characterized by being readily and stably dispersed in nonpolar organic liquids. A further object is to provide the process for preparing solid, metal-containing compositions from non-Newtonian colloidal disperse systems.

These and other objects of this invention are achieved by providing a process for preparing solid, metal-containing compositions comprising separating substantially all of the liquid dispersing medium from a non-Newtonian colloidal disperse system which consists essentially of solid, metal-containing colloidal particles predispersed in a liquid dispersing medium, and as an essential third component, at least one organic compound which is soluble in said disperse medium, the molecules of said organic compound being characterized by a hydrophobic portion and at least one polar substituent, thereby isolating the desired solid, metal-containing compositions. Stated differently, the process, including the formation of the non-Newtonian colloidal dispersed system, comprises homogenizing at least one overbased organic material having a metal ratio of at least three which is homogeneously dispersed in a substantially inert, nonpolar, organic liquid diluent in the presence of at least one conversion agent, and thereafter separating from the resulting homogenized products substantially all of the non-polar organic liquid diluent, conversion agent, and water from the remainder of the reaction mixture thereby isolating the desired solid, metal-containing composition.

THE COLLOIDAL DISPERSE SYSTEMS USED AS INTERMEDIATES

The terminology "disperse system" as used in the specification and claims is a term of art generic to colloids or colloidal solutions, e.g., "any homogeneous medium containing dispersed entities of any size and state," Jirgensons and Straumanis, A Short Text Book on Colloidal Chemistry, second edition, The MacMillan Co., New York, 1962, page 1. However, the particular dispersed systems of the present invention form a subgenus within this broad class of disperse systems, this subgenus being characterized by several important features.

This subgenus comprises those dispersed systems wherein at least a portion of the particles dispersed therein are solid, metal-containing particles formed in situ. At least about 10% to about 50% are particles of this type and preferably, substantially all of said solid particles are formed in situ.

So long as the solid particles remain dispersed in the dispersing medium as colloidal particles the particle size is not critical. Ordinarily, the particles will not exceed 5000 A. However, it is preferred that the maximum unit particle size be less than about 1000 A. In a particularly preferred aspect of the invention, the unit particle size is less than about 400 A. Systems having a unit particle size in that range of 30 A. to 200 A. give excellent results. The minimum unit particle size is at least 20 A. and preferably at least about 30 A.

The language "unit particle size" is intended to designate the average particle size of the solid, metal-containing particles assuming maximum dispersion of the individual particles throughout the disperse medium. That is, the unit particle is that particle which corresponds in size to the average size of the metal-containing particles and is capable of independent existence within the disperse system as a discrete colloidal particle. These metal-containing particles are found in two forms in the disperse systems. Individual unit particles can be dispersed as such throughout the medium or unit particles can form an agglomerate, in combination with other materials (e.g., another metal-containing particle, the disperse medium, etc.) which are present in the disperse systems. These agglomerates are dispersed through the system as "metal-containing particles." Obviously, the "particle size" of the agglomerate is substantially greater than the unit particle size. Furthermore, it is equally apparent that this agglomerate size is subject to wide variations, even within the same disperse system. The agglomerate size varies, for example, with the degree of shearing action employed in dispersing the unit particles. That is, mechanical agitation of the disperse system tends to break down the agglomerates into the individual components thereof and disperse these individual components throughout the disperse medium. The ultimate in dispersion is achieved when each solid, metal-containing particle is individually dispersed in the medium. Accordingly, the disperse systems are characterized with reference to the unit particle size, it being apparent to those skilled in the art that the unit particle size represents the average size of solid, metal-containing particles present in the system which can exist independently. The average particle size of the metal-containing solid particles in the system can be made to approach the unit particle size value by the application of a shearing action to the existent system or during the formation of the disperse system as the particles are being formed in situ. It is not necessary that maximum particle dispersion exist to have useful disperse systems. The agitation associated with homogenization of the overbased material and conversion agent produces sufficient particle dispersion.

Basically, the solid metal-containing particles are in the form of metal salts of inorganic acids and low molecular weight organic acids, hydrates thereof, or mixtures of these. These salts are usually the alkali and alkaline earth metal formates, acetates, carbonates, hydrogen carbonates, hydrogen sulfides, sulfites, hydrogen sulfites, and halides, particularly chlorides. In other words, the metal-containing particles are ordinarily particles of metal salts, the unit particle is the individual salt particle and the unit particle size is the average particle size of the salt particles which is readily ascertained, as for example, by conventional X-ray diffraction techniques. Colloidal disperse systems possessing particles of this type are sometimes referred to as macromolecular colloidal systems.

Because of the composition of the colloidal disperse systems of this invention, the metal-containing particles also exist as components in micellar colloidal particles. In addition to the solid metal-containing particles and the disperse medium, the colloidal disperse systems of the invention are characterized by a third essential component, one which is soluble in the medium and contains in the molecules thereof a hydrophobic portion and at least one polar substituent. This third component can orient itself along the external surfaces of the above metal salts, the polar groups lying along the surface of these salts with the hydrophobic portions extending from the salts into the disperse medium forming micellar colloidal particles. These micellar colloids involve weak intermolecular forces, e.g., Van der Waals forces, ionic bonds, etc. Micellar colloids represent a type of agglomerate particle as discussed thereinabove. Because of the molecular orientation in these micellar colloidal particles, such particles are characterized by a metal containing layer (i.e., the solid metal-containing particles and any metal present in the polar substituent of the third component, such as the metal in a sulfonic or carboxylic acid salt group), a hydrophobic layer formed by the hydrophobic portions of the molecules of the third component and a polar layer bridging said metal-containing layer and said hydrophobic layer, said polar bridging layer comprising the polar substituents of the third component of the system, e.g., the

group if the third component is an alkaline earth metal petrosulfonate.

The second essential component of the colloidal disperse system is the dispersing medium. The identity of the medium is not a particularly critical aspect of the invention as the medium primarily serves as the liquid vehicle in which solid particles are dispersed. The disperse medium will normally consist of inert organic liquids, that is, liquids which are chemically substantially inactive in the particular environment in question (the resinous composition). While many of these inert organic liquids are nonpolar, this is not essential. For example, many of the plasticizers for the resinous components of the composition are esters, etc. These polar materials can also be used as the dispersing medium or components thereof. The medium can have components characterized by relatively low boiling points, e.g., in the range of 25° to 120° C. to facilitate subsequent removal of a portion or substantially all of the medium from the polymeric resin composition or the components can have a higher boiling point to protect against removal from the resinous composition upon standing or heating. Obviously, there is no criticality in an upper boiling point limitation on these liquids.

Representative liquids include the alkanes and haloalkanes of five to eighteen carbons, polyhalo- and perhaloalkanes of up to about six carbons, the cycloalkanes of five or more carbons, the corresponding alkyl- and/or halo-substituted cycloalkanes, the aryl hydrocarbons, the alkylaryl hydrocarbons, the haloaryl hydrocarbons, ethers such as dialkyl ethers, alkylaryl ethers, cycloalkyl ethers, cycloalkylalkyl ethers, alkyl ethers of alkylene and polyalkylene glycols, dimethyl formamide, dimethyl acetamide, dibasic alkanoic acid diesters, silicate esters, and mixtures of these. Specific examples include petroleum ether, Stoddard Solvent, pentane, hexane, octane, isooctane, undecane, tetradecane, cyclopentane, cyclohexane, isopropylcyclohexane, 1,4 - dimethylcyclohexane, cyclooctane, benzene, toluene, xylene, ethyl benzene, tert-butyl-benzene, halobenzenes especially mono- and polychlorobenzenes such as chlorobenzene per se and 3,4-dichlorotoluene, mineral oils, n-propylether, isopropylether, isobutylether, n-amylether, methyl-n-amylether, cyclohexylether, ethoxycyclohexane, methoxybenzene, isopropoxybenzene, p-methoxytoluene, 1,2-difluoro-tetrachloroethane, dichlorofluoromethane, 1,2-dibromotetrafluorethane, trichlorofluoromethane, 1 - chloropentane, 1,3 - dichlorohexane, formamide, acetamide, dimethylacetamide, diethylacetamide, propionamide, di-isooctyl azelate, hexa-2-ethylbutoxy disiloxane, etc.

Also useful as dispersing mediums are the low molecular weight, liquid polymers, generally classified as oligomers, which include the dimers, tetramers, pentamers, etc. Illustrative of this large class of materials are such liquids as the propylene tetramers, isobutylene dimers, and the like.

From the standpoint of availability, cost, and performance, the alkyl, cycloalkyl, and aryl hydrocarbons represent a preferred class of disperse mediums. Liquid petroleum fractions represent another preferred class of disperse mediums. Included within these preferred classes are benzenes and alkylated benzenes, cycloalkanes and alkylated cycloalkanes, cycloalkenes and alkylated cycloalkenes such as found in naphthene based petroleum fractions, and the alkanes such as found in the paraffin-based petroleum fractions. Petroleum ether, naphthas, mineral oils, Stoddard Solvent, toluene, xylene, etc., and mixtures thereof are examples of economical sources of suitable inert organic liquids which can function as the disperse medium in the colloidal disperse systems of the present invention.

The most preferred disperse systems are those containing at least some mineral oil as a component of the disperse medium. These systems are particularly effective as lubricants for the polymeric composition, an important feature in extrusion processes. Any amount of mineral oil is beneficial in this respect. However, in this preferred class of systems, it is desirable that mineral oil comprise at least about 1% by weight of the total medium, and preferably at least about 5% by weight. Those mediums comprising at least 10% by weight mineral oil are especially useful. As will be seen hereinafter, mineral oil can serve as the exclusive disperse medium.

In addition to the solid, metal-containing particles in the disperse medium, the two essential elements of any disperse system, the disperse systems employed in the polymeric compositions of the invention require a third essential component. This third component is an organic compound which is soluble in the disperse medium, and the molecules of which are characterized by a hydrophobic portion and at least one polar substituent. As explained, infra, the organic compounds suitable as a third component are extremely diverse. These compounds are inherent constituents of the disperse systems as a result of the methods used in preparing the systems. Further characteristics of the components are apparent from the following discussion of methods for preparing the colloidal disperse systems.

PREPARATION OF THE DISPERSE SYSTEMS

Broadly speaking, the colloidal disperse systems of the invention are prepared by treating a single phase homogeneous, Newtonian system of an "overbased," "superbased," or "hyperbased," organic compound with a conversion agent, usually an active hydrogen containing compound, the treating operation being simply a thorough mixing together of the two components, i.e., homogenization. This treatment converts these single phase systems into the non-Newtonian colloidal disperse systems utilized in conjunction with the polymeric resins of the present invention.

The terms "overbased," "superbased," and "hyperbased," are terms of art which are generic to well known classes of metal-containing materials which have generally been employed as detergents and/or dispersants in lubricating oil compositions. These overbased materials have also been referred to as "complexes," "metal complexes," "high-metal containing salts," and the like. Overbased materials are characterized by a metal content in excess of that which would be present according to the stoichiometry of the metal and the particular organic compound reacted with the metal, e.g., a carboxylic or sulfonic acid. Thus, if a monosulfonic acid,

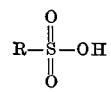

is neutralized with a basic metal compound, e.g., calcium hydroxide, the "normal" metal salt produced will contain one equivalent of calcium for each equivalent of acid, i.e.,

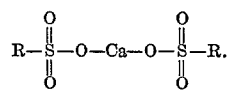

However, as is well known in the art, various processes are available which result in an inert organic liquid solution of a product containing more than the stoichiometric amount of metal. The solutions of these products are referred to herein as overbased materials. Following these procedures, the sulfonic acid or an alkali or alkaline earth metal salt thereof can be reacted with a metal base and the product will contain an amount of metal in excess of that necessary to neutralize the acid, for example, 4.5 times as much metal as present in the normal salt or a metal excess of 3.5 equivalents. The actual stoichiometric excess of metal can vary considerably, for example, from about 0.1 equivalent to about 30 or more equivalents depending on the reactions, the process conditions, and the like. These overbased materials useful in preparing the disperse systems will contain from about 3.5 to about 30 or more equivalents of metal for each equivalent of material which is overbased.

In the present specification and claims the term "overbased" is used to designate materials containing a stoichiometric excess of metal and is, therefore, inclusive of those materials which have been referred to in the art as overbased, superbased, hyperbased, etc., as discussed supra.

The terminology "metal ratio" is used in the prior art and herein to designate the ratio of the total chemical equivalents of the metal in the overbased material (e.g., a metal sulfonate or carboxylate) to the chemical equivalents of the metal in the product which would be expected to result in the reaction between the organic material to be overbased (e.g., sulfonic or carboxylic acid) and the metal-containing reactant (e.g., calcium hydroxide, barium oxide, etc.) according to the known chemical reactivity and stoichiometry of the two reactants. Thus, in the normal calcium sulfonate discussed above, the metal ratio is one and in the overbased sulfonate, the metal ratio is 4.5. Obviously, if there is present in the material to be overbased more than one compound capable of reacting with the metal, the "metal ratio" of the product will depend upon whether the number of equivalents of metal in the overbased product is compared to the number of equivalents expected to be present for a given single component or a combination of all such components.

Generally, these overbased materials are prepared by treating a reaction mixture comprising the organic material to be overbased, a reaction medium consisting essentially of at least one inert, organic solvent for said organic material, a stoichiometric excess of a metal base, and a promoter with an acidic material. The methods for preparing the overbased materials as well as an extremely diverse group of overbased materials are well known in the prior art and are disclosed, for example in the following U.S. patents: 2,616,904; 2,616,905; 2,616,906; 2,616,911; 2,616,924; 2,616,925; 2,617,049; 2,695,910; 2,723,234; 2,723,235; 2,723,236; 2,760,970; 2,767,164; 2,767,209; 2,777,874; 2,798,852; 2,839,470; 2,856,359; 2,859,360; 2,856,361; 2,861,951; 2,883,340; 2,915,517; 2,959,551; 2,968,642; 2,971,014; 2,989,463; 3,001,981; 3,027,325; 3,070,581; 3,108,960; 3,147,232; 3,133,019; 3,146,201; 3,152,991; 3,155,616; 3,170,880; 3,170,881; 3,172,855; 3,194,823; 3,223,630; 3,232,883; 3,242,079; 3,242,080; 3,250,710; 3,256,186; 3,274,135. The disclosures of these patents disclose exemplary processes for synthesizing the overbased materials used in producing the disperse systems of the invention and are, accordingly, incorporated herein by reference for their disclosures of these processes, materials which can be overbased, suitable metal bases, promoters, and acidic materials, as well as a variety of specific overbased products.

An important characteristic of the organic materials which are overbased is their solubility in the particular reaction medium utilized in the overbasing process. As the reaction medium used previously has normally comprised petroleum fractions, particularly mineral oils, these organic materials have generally been oil-soluble. However, if another reaction medium is employed (e.g. aromatic hydrocarbons, aliphatic hydrocarbons, kerosene, etc.) it is not essential that the organic material be soluble in mineral oil as long as it is soluble in the given reaction medium. Obviously, many organic materials which are soluble in mineral oils will be soluble in many of the other indicated suitable reaction mediums. It should be apparent that the reaction medium usually becomes the disperse medium of the colloidal disperse system or at least a component thereof depending on whether or not additional inert organic liquid is added as part of the reaction medium or the disperse medium.

Materials which can be overbased are generally oil-soluble organic acids including phosphorus acids, thiophosphorus acids, sulfur acids, carboxylic acids, thiocarboxylic acids, and the like, as well as the corresponding alkali and alkaline earth metal salts thereof. Representative examples of each of these classes of organic acids as well as other organic acids, e.g., nitrogen acids, arsenic acids, etc. are disclosed along with methods of preparing overbased products therefrom in the above cited patent and are, accordingly, incorporated herein by reference. Pat. 2,777,874 identified organic acids suitable for preparing overbased materials which can be converted to disperse systems for use in the resinous compositions of the invention. Similarly, 2,616,904; 2,695,910; 2,767,164; 2,767,209; 3,147,232; 3,274,135; etc. disclose a variety of organic acids suitable for preparing overbased materials as well as representative examples of overbased products prepared from such acids. Overbased acids wherein the acid is a phosphorus acid, a thiophosphorus acid, phosphorus acid-sulfur acid combination, and sulfur acid prepared from polyolefins are disclosed in 2,883,340; 2,915,517; 3,001,981; 3,108,960; and 3,232,883. Overbased phenates are disclosed in 2,959,551 while overbased ketones are found in 2,798,852. A variety of overbased materials derived from oil-soluble metal-free, non-tautomeric neutral and basic organic polar compounds such as esters, amines, amides, alcohols, ethers, sulfides, sulfoxides, and the like are disclosed in 2,968,642; 2,971,014; and 2,989,463. Another class of materials which can be overbased are the oil-soluble, nitro-substituted alphatic hydrocarbons, particularly nitro-substituted polyolefins such as polyethylene, polypropylene, polyisobutylene, etc. Materials of this type are illustrated in 2,959,551. Likewise, the oil-soluble reaction product of alkylene polyamines such as propylene diamine or N-alkylated propylene diamine with formaldehyde or formaldehyde producing compound (e.g., paraformaldehyde) can be overbased. Other compounds suitable for overbasing are disclosed in the above-cited patents or are otherwise well-known in the art.

The organic liquids used as the disperse medium in the colloidal disperse system can be used as solvents for the overbasing process.

The metal compounds used in preparing the overbased materials are normally the basic salts of metals in Group I–A and Group II–A of the Periodic Table although other metals such as lead, zinc, manganese, etc. can be used in the preparation of overbased materials. The anionic portion of the salt can be hydroxyl, oxide, carbonate, hydrogen carbonate, nitrate, sulfite, hydrogen sulfite, halide, amide, sulfate etc. as disclosed in the above-cited patents. For purposes of this invention the preferred overbased materials are prepared from the alkaline earth metal oxides, hydroxides, and alcoholates such as the alkaline earth metal lower alkoxides. The most preferred disperse systems of the invention are made from overbased materials containing calcium and/or barium as the metal.

The promoters, that is, the materials which permit the incorporation of the excess metal into the overbased material, are also quite diverse and well known in the art as evidenced by the cited patents. A particularly comprehensive discussion of suitable promoters is found in 2,777,874; 2,695,910; and 2,616,904. These include the alcoholic and phenolic promoters which are preferred. The alcoholic promoters include the alkanols of one to about twelve carbon atoms such as methanol, ethanol, amyl alcohol, octanol, isopropanol, and mixtures of these and the like. Phenolic promoters include a variety of hydroxy-substituted benzenes and naphthalenes. A particularly useful class of phenols are the alkylated phenols of the type listed in 2,777,874, e.g., heptylphenols, octylphenols, and nonylphenols. Mixtures of various promoters are sometimes used.

Suitable acidic materials are also disclosed in the above cited patents, for example, 2,616,904. Included within the known group of useful acidic materials are liquid acids such as formic acid, acetic acid, nitric acid, sulfuric acid, hydrochloric acid, hydrobromic acid, carbamic acid, substituted carbamic acids, etc. Acetic acid is a very useful acidic material although inorganic acidic materials such as HCl, $SO_2$, $SO_3$, $CO_2$, $H_2S$, $N_2O_3$, etc., are ordinarily employed as the acidic materials. The most preferred acidic materials are carbon dioxide and acetic acid.

In preparing overbased materials, the material to be overbased, an inert, non-polar, organic solvent therefor, the metal base, the promoter, and the acidic material are brought together and a chemical reaction ensues. The exact nature of the resulting overbased product is not known. However, it can be adequately described for purposes of the present specification as a single phase homogeneous mixture of the solvent and (1) either a metal complex formed from the metal base, the acidic material, and the material being overbased and/or (2) an amorphous metal salt formed from the reaction of the acidic material with the metal base and the material which is said to be overbased. Thus, if mineral oil is used as the reaction medium, petrosulfonic acid as the material which is overbased, $Ca(OH)_2$ as the metal base, and carbon dioxide as the acidic material, the resulting overbased material can be described for purposes of this invention as an oil solution of either a metal containing complex of the acidic material, the metal base, and the petrosulfonic acid or as an oil solution of amorphous calcium carbonate and calcium petrosulfonate. Since the overbased materials are well-known and as they are used merely as intermediates in the preparation of the disperse systems employed herein, the exact nature of the materials is not critical to the present invention.

The temperature at which the acidic material is contacted with the remainder of the reaction mass depends to a large measure upon the promoting agent used. With a phenolic promoter, the temperature usually ranges from about 80° C. to 300° C., and preferably from about 100° C. to about 200° C. When an alcohol or mercaptan is used as the promoting agent, the temperature usually will not exceed the reflux temperature of the reaction mixture and preferably will not exceed about 100° C.

In view of the foregoing, it should be apparent that the overbased materials may retain all or a portion of the promoter. That is, if the promoter is not volatile (e.g., an alkyl phenol) or otherwise readily removable from the overbased material, at least some promoter remains in the overbased product. Accordingly, the disperse systems made from such products may also contain the promoter. The presence or absence of the promoter in the overbased material used to prepare the disperse system and likewise, the presence or absence of the promoter in the colloidal disperse systems themselves does not represent a critical aspect of the invention. Obviously, it is within the skill of the art to select a volatile promoter such as a lower alkanol, e.g., methanol, ethanol, etc., so that the promoter can be readily removed prior to forming the disperse system or thereafter.

A preferred class of overbased materials used as starting materials in the preparation of the disperse systems of the present invention are the alkaline earth metal-overbased oil-soluble organic acids, preferably those containing at least twelve aliphatic carbons although the acids may contain as few as eight aliphatic carbon atoms if the acid molecule includes an aromatic ring such as phenyl, naphthyl, etc. An especially preferred class are the calcium overbased organic acids. This especially preferred class of overbased materials, processes for homogenizing them, and processes for isolating the desired, solid calcium-containing composition in the form of a micellar complex art illustrated, discussed and claimed in my copending applications Ser. No. 886,790 filed Dec. 19, 1969, and Ser. No. 179,160 filed on or about Sept. 9, 1971, both entitled "Calcium-Containing Micellar Complexes" which are expressly incorporated herein by reference for their full description of how to make and use this especially preferred aspect of the invention. Representative organic acids suitable for preparing these overbased materials are discussed and identified in detail in the above-cited patents. Particularly 2,616,904 and 2,777,874 disclose a variety of very suitable organic acids. For reasons of economy and performance, overbased oil-soluble carboxylic and sulfonic acids are particularly suitable. Illustrative of the carboxylic acids are palmitic acid, stearic acid, myristic acid, oleic acid, linoleic acid, behenic acid, hexatriacontanoic acid, tetrapropylene-substituted glutaric acid, polyisobutene (M.W.—5000)-substituted succinic acid, polypropylene (M.W.—10,000)-substituted succinic acid, octadecyl-substituted adipic acid, chlorostearic acid, 9-methylstearic acid, dichlorostearic acid, stearylbenzoic acid, eicosane-substituted naphthoic acid, dilauryl-decahydronaphthalene carboxylic acid, didodecyl-Tetralin carboxylic acid, dioctylcyclohexane carboxylic acid, mixtures of these acids, their alkali and alkaline earth metal salts, and/or their anhydrides. Of the oil-soluble sulfonic acids, the mono-, di-, and tri-aliphatic hydrocarbon substituted aryl sulfonic acids and the petroleum sulfonic acids (petrosulfonic acids) are particularly preferred. Illustrative examples of suitable sulfonic acids include mahogany sulfonic acids, petrolatum sulfonic acids, monoeicosane-substituted naphthalene sulfonic acids, dodecylbenzene sulfonic acids, didodecylbenzene sulfonic acids, dinonylbenzene sulfonic acids, cetyl-chlorobenzene sulfonic acids, dilauryl beta-naphthalene sulfonic acids, the sulfonic acid derived by the treatment of polyisobutene having a molecular weight of 1,500 with chlorosulfonic acid, nitronaphthalenesulfonic acid, paraffin wax sulfonic acid, cetylcyclopentane sulfonic acid, lauryl-cyclohexanesulfonic acids, polyethylene (M.W.—750) sulfonic acids, etc. Obviously, it is necessary that the size and number of aliphatic groups on the aryl sulfonic acids be sufficient to render the acids soluble. Normally the aliphatic groups will be alkyl and/or alkenyl groups such that the total number of aliphatic carbons is at least twelve.

Within this preferred group of overbased carboxylic and sulfonic acids, the barium and calcium overbased mono-, di-, and tri-alkylated benzene and naphthalene (including hydrogenated forms thereof), petrosulfonic acids, and higher fatty acids are especially preferred. Illustrative of the synthetically produced alkylated benzene and naphthalene sulfonic acids are those containing alkyl substituents having from 8 to about 30 carbon atoms therein. Such acids include di-isododecyl-benzene sulfonic acid, wax-substituted phenol sulfonic acid, wax-substituted benzene sulfonic acids, polybutene-substituted sulfonic acid, cetyl-chlorobenzene sulfonic acid, di-cetylnaphthalene sulfonic acid, di-lauryldiphenylether sulfonic acid, di-isononylbenzene sulfonic acid, di-isooctadecylbenzenesulfonic acid, stearylnaphthalene sulfonic acid, and the like. The petroleum sulfonic acids are a well known art recognized class of materials which have been used as starting materials in preparing overbased products since the inception of overbasing techniques as illustrated by the above patents. Petroleum sulfonic acids are obtained by treating refined or semi-refined petroleum oils with concentrated or fuming sulfuric acid. These acids remain in the oil after the settling out of sludges. These petroleum sulfonic acids, depending on the nature of the petroleum oils from which they are prepared, are oil-soluble alkane sulfonic acids, alkyl-substituted cycloaliphatic sulfonic acids including cycloalkyl sulfonic acids and cycloalkene sulfonic acids, and alkyl, alkaryl, or aralkyl substituted hydrocarbon aromatic sulfonic acids including single and condensed aromatic nuclei as well as partially hydrogenated forms thereof. Examples of such petrosulfonic acids include mahogany sulfonic acid, white oil sulfonic acid, petrolatum sulfonic acid, petroleum naphthene sulfonic acid, etc. This especially preferred group of aliphatic fatty acids includes the saturated and unsaturated higher fatty acids containing from 12 to about 30 carbon atoms. Illustrative of these acids are lauric acid, palmitic acid, oleic acid, linoleic acid, linolenic acid, oleo-stearic acid, stearic acid, myristic acid, and undecalinic acid, alpha-chlorostearic acid, and alpha-nitrolauric acid.

As shown by the representative examples of the preferred classes of sulfonic and carboxylic acids, the acids may contain non-hydrocarbon substituents such as halo, nitro, alkoxy, hydroxyl, and the like.

It is desirable that the overbased materials used to prepare the disperse system have a metal ratio of at least about 3.0 and preferably about 4.5. An especially suitable group of the preferred sulfonic acid overbased materials has a metal ratio of at least about 7.0. While overbased materials having a metal ratio of 75 have been prepared, normally the maximum metal ratio will not exceed about 30 and, in most cases, not more than about 20.

The overbased materials used in preparing the colloidal disperse systems utilized in the polymeric composition of the invention contain from about 15% to about 70% by weight of metal-containing components. As explained hereafter, the exact nature of these metal containing components is not known. It is theorized that the metal base, the acidic material, and the organic material being overbased form a metal complex, this complex being the metal-containing component of the overbased material. On the other hand, it has also been postulated that the metal base and the acidic material form amorphous metal compounds which are dissolved in the inert organic reaction medium and the material which is said to be overbased. The material which is overbased may itself be a metal-containing compound, e.g., a carboxylic or sulfonic acid metal salt. In such a case, the metal-containing components of hte overbased material would be both the amorphous compounds and the acid salt. The exact nature of these overbased materials is obviously not critical in the present invention since these materials are used only as intermediates. The remainder of the overbased materials consist essentially of the inert organic reaction medium and any promoter which is not removed from the overbased product. For purposes of this application, the organic material which is subjected to overbasing is considered a part of the metal containing components. Normally, the liquid reaction medium constitutes at least about 30% by weight of the reaction mixture utilized to prepare the overbased materials.

As mentioned above, the colloidal disperse systems used in the composition of the present invention are prepared by homogenizing a "conversion agent" and the overbased starting material. Homogenization is achieved by vigorous agitation of the two components, preferably at the reflux temperature or a temperature slightly below the reflux temperature. The reflux temperaure normally will depend upon the boiling point of the conversion agent. However, homogenization may be achieved within the range of about 25° C. to about 200° C. or slightly higher. Usually, there is no real advantage in exceeding 150° C.

The concentration of the conversion agent necessary to achieve conversion of the overbased material is usually within the range of from about 1% to about 80% based upon the weight of the overbased material excluding the weight of the inert, organic solvent and any promoter present therein. Preferably at least about 10% and usually less than about 60% by weight of the conversion agent is employed. Concentrations beyond 60% appear to afford no additional advantages.

The terminology "conversion agent" as used in the specification and claims is intended to describe a class of very diverse materials which possess the property of being able to convert the Newtonian homogeneous, single-phase, overbased materials into non-Newtonian colloidal disperse systems. The mechanism by which conversion is accomplished is not completely understood. However, with the exception of oxygen, carbon dioxide, air and mixtures of two or more of these, these conversion agents all possess active hydrogens. The conversion agents include lower aliphatic carboxylic acids, water, aliphatic alcohols, cycloaliphatic alcohols, arylaliphatic alcohols, phenols, ketones, aldehydes, amines, boron acids, phosphorus acids, oxygen, air, and carbon dioxide. Mixtures of two or more of these conversion agents are also useful. Particularly useful conversion agents are discussed below.

The lower aliphatic carboxylic acids are those containing less than about eight carbon atoms in the molecule. Examples of this class of acids are formic acid, acetic acid, propionic acid, butyric acid, valeric acid, isovaleric acid, isobutyric acid, caprylic acid, heptanoic acid, chloroacetic acid, dichloroacetic acid, trichloroacetic acid, etc. Formic acid, acetic acid, and propionic acid, are preferred with acetic acid being especially suitable. It is to be understood that the anhydrides of these acids are also useful and, for the purposes of the specification and claims of this invention, the term acid is intended to include both the acid per se and the anhydride of the acid.

Useful alcohols include aliphatic, cycloaliphatic, and arylaliphatic mono- and polyhydroxy alcohols. Alcohols having less than about twelve carbons are especially useful while the lower alkanols, i.e., alkanols having less than about eight carbon atoms are preferred for reasons of economy and effectiveness in the process. Illustrative are the alkanols such as methanol, ethanol, isopropanol, n-propanol, isobutanol, tertiary butanol, isooctanol, dodecanol, n-pentanol, etc.; cycloalkyl alcohols exemplified by cyclopentanol, cyclohexanol, 4-methylcyclohexanol, 2-cyclohexylethanol, cyclopentylmethanol, etc.; phenyl aliphatic alkanols such as benzyl alcohol, 2-phenylethanol, and cinnamyl alcohol; alkylene glycols of up to about six carbon atoms and mono-lower alkyl ethers thereof such as monomethylether of ethylene glycol, diethylene glycol, ethylene glycol, trimethylene glycol, hexamethylene glycol, tirethylene glycol, 1,4-butanediol, 1,4-cyclohexanediol, glycerol, and pentaerythritol.

The use of a mixture of water and one or more of the alcohols is especially effective for converting the overbased materials to colloidal disperse systems. Such combinations often reduce the length of time required for the process. Any water-alcohol combination is effective but a very effective combination is a mixture of one or more alcohols and water in a weight ratio of alcohol to water of from about 0.05:1 to about 24:1. Preferably, at least one lower alkanol is present in the alcohol component of these water-alkanol mixtures. Water-alkanol mixtures wherein the alcoholic portion is one or more lower alkanols are especially suitable. Alcohol:water conversions are illustrated in co-pending application Ser. No. 535,693, filed Mar. 21, 1966, now U.S. Pat. 3,372,115.

Phenols suitable for use as conversion agents include phenol, naphthol, ortho-cresol, para-cresol, catechol, mixtures of cresol, para-tert-butylphenol, and other lower alkyl substituted phenols, meta-polyisobutene(M.W.—350)-substituted phenol, and the like.

Other useful conversion agents include lower aliphatic aldehydes and ketones, particularly lower alkyl aldehydes and lower alkyl ketones such as acetaldehydes, propionaldehydes, butyraldehydes, acetone, methylethyl ketone, diethyl ketone. Various aliphatic, cycloaliphatic, aromatic, and heterocyclic amines are also useful providing they contain at least one amino group having at least one active hydrogen attached thereto. Illustrative of these amines are the mono- and di-alkylamines, particularly mono- and di-lower alkylamines, such as methylamine, ethylamine, propylamine, dodecylamine, methyl ethylamine, diethylamine; the cycloalkylamines such as cyclohexylamine, cyclopentylamine, and the lower alkyl substituted cycloalkylamines such as 3-methylcyclohexylamine; 1,4-cyclohexylenediamine; arylamines such as aniline, mono-, di-, and tri-, lower alkyl-substituted phenyl amines, naphthylamines, 1,4-phenylene diamines; lower alkanol amines such as ethanolamine and diethanolamine; alkylenediamines such as ethylene diamine, triethylene tetramine, propylene diamines, octamethylene diamines and heterocyclic amines such as piperazine, 4-aminoethylpiperazine, 2-octadecyl-imidazoline, and oxazolidine. Boron acids are also useful conversion agents and include bornic acids (e.g., alkyl-B(OH)$_2$ or aryl-B(OH$_2$), boric acid (i.e., $H_3BO_3$), tetraboric acid, metaboric acid, and esters of such boron acids.

The phosphorus acids are useful conversion agents and include the various alkyl and aryl phosphinic acids, phosphinus acids, phosphonic acids, and phosphonous acids. Posphorus acids obtained by the reaction of lower alkanols or unsaturated hydrocarbons such as polyisobutenes with phosphorus oxides and phosphorus sulfides are particularly useful, e.g., $P_2O_5$ and $P_2S_5$.

Oxygen, carbon dioxide, air, and various mixtures of oxygen and carbon dioxide can be used as conversion agents. However, it is preferable to use these conversion agents in combination with one or more of the foregoing conversion agents. For example, the combination of water and carbon dioxide is particularly effective as a conversion agent for transforming the overbased materials into a colloidal disperse system.

As previously mentioned, the overbased materials are single phase homogeneous systems. However, depending on the reaction conditions and the choice of reactants in preparing the overbased materials, there sometimes are present in the product insoluble contaminants. These contaminants are normally unreacted basic materials such as calcium oxide, barium oxide, calcium hydroxide, barium hydroxide, or other metal base materials used as a reactant in preparing the overbased material. It has been found that a more uniform colloidal disperse system results if such contaminants are removed prior to homogenizing the overbased material with the conversion agents. Obviously a more uniform disperse system makes it possible to achieve reproducibility of properties in resinous compositions containing such systems. Accordingly, it is preferred that any insoluble contaminants in the overbased materials be removed prior to converting the material in the colloidal disperse system. The removal of such contaminants is easily accomplished by conventional techniques such as filtration or centrifugation. It should be understood however, that the removal of these contaminants, while desirable for reasons just mentioned, is not an absolute essential aspect of the invention and useful products can be obtained when overbased materials containing insoluble contaminants are converted to the colloidal disperse systems.

The conversion agents or a proportion thereof may be retained in the colloidal disperse system. The conversion agents are however, not essential components of these disperse systems and it is usually desirable that as little of the conversion agents as possible be retained in the disperse systems. Since these conversion agents do not react with the overbased material in such a manner as to be permanently bound thereto through some type of chemical bonding, it is normally a simple matter to remove a major proportion of the conversion agents and, generally substantially all of the conversion agents. Some of the conversion agents have physical properties which make them readily removable from the disperse systems. Thus, most of the free carbon dioxide and/or oxygen gradually escapes from the disperse system during the homogenization process or upon standing thereafter. Since the liquid conversion agents are generally more volatile than the remaining components of the disperse system, they are readily removable by conventional devolatilization techniques, e.g., heating, heating at reduced pressures, and the like. For this reason, it may be desirable to select conversion agents which will have boiling points which are lower than the remaining components of the disperse system. This is another reason why the lower alkanols, mixtures thereof, and lower alkanol-water mixtures are preferred conversion agents.

Again, it is not essential that all of the conversion agent be removed from the disperse systems. In fact, useful disperse systems for employment in the resinous compositions of the invention result without removal of the conversion agents. However, from the standpoint of achieving uniform results, it is generally desirable to remove the conversion agents, particularly where they are volatile. In some cases, the liquid conversion agents may facilitate the mixing of the colloidal disperse system with the polymeric resin material. In such cases, it is advantageous to permit the conversion agents to remain in the disperse system until it is mixed with the polymeric resin. Thereafter, the conversion agents can be removed from the mixture of the disperse system and polymeric resins by conventional devolatilization techniques if desired.

To better illustrate the colloidal disperse systems utilized in the invention, the procedure for preparing a preferred system is described below:

THE OVERBASED MATERIAL

As stated above, the essential materials for preparing an overbased product are (1) the organic material to be overbased, (2) an inert, non-polar organic solvent for the organic material, (3) a metal base, (4) a promoter, and (5) an acidic material. In this example, these materials are (1) calcium petrosulfonate, (2) mineral oil, (3) calcium hydroxide, (4) a mixture of methanol, isobutanol, and n-pentanol, and (5) carbon dioxide.

A reaction mixture of 1305 grams of calcium sulfonate having a metal ratio of 2.5 dissolved in mineral oil, 220 grams of methyl alcohol, 72 grams of isobutanol, and 38 grams of n-pentanol is heated to 35° C. and subjected to the following operating cycle four times: mixing with 143 grams of 90% calcium hydroxide and treating the mixture with carbon dioxide until it has a base number of 32–39. The resulting product is then heated to 155° C. during a period of 9 hours to remove the alcohols and then filtered at this temperature. The filtrate is a calcium overbased petrosulfonate having a metal ratio of 12.2.

CONVERSION TO A COLLOIDAL DISPERSE SYSTEM

A mixture of 150 parts of the overbased material, 15 parts of methyl alcohol, 10.5 parts of n-pentanol and 45 parts of water is heated under reflux conditions at 71°–74° C. for 13 hours. The mixture becomes a gel. It is then heated to 144° over a period of 6 hours and diluted with 126 parts of mineral oil having a viscosity of 2000 SUS at 100° F. and the resulting mixture heated at 144° C. for an additional 4.5 hours with stirring. This thickened product is a colloidal disperse system of the type contemplated by the present invention.

The disperse systems of the invention are characterized by three essential components: (A) solid, metal-containing particles formed in situ, (B) an inert, non-polar, organic liquid which functions as the disperse medium, and (C) an organic compound which is soluble in the disperse medium and the molecules of which are characterized by a hydrophobic portion and at least one polar substituent. In the colloidal disperse system described immediately above, these components are as follows: (A) calcium carbonate in the form of solid particles, (B) mineral oil, and (C) calcium petrosulfonate.

From the foregoing example, it is apparent that the solvent for the material which is overbased becomes the colloidal disperse medium or a component thereof. Of course, mixtures of other inert liquids can be substituted for the mineral oil or used in conjunction with the mineral oil prior to forming the overbased material. Moreover, after the overbased material is prepared, additional liquid material, e.g., a plasticizer for the resin can be added if desired, to form a part of the disperse medium. It is also readily seen that the solid, metal-containing particles formed in situ possess the same chemical composition as would the reaction products of the metal base and the acidic material used in preparing the overbased materials. Thus, the actual chemical identity of the metal containing particles formed in situ depends upon both the particular metal base or bases employed and the particular acidic material or materials reacted therewith. For example, if the metal base used in preparing the overbased material were barium oxide and if the acidic material was a mixture of formic and acetic acids, the metal-containing particles formed in situ would be barium formates and barium acetates.

However, the physical characteristics of the particles formed in situ in the conversion step are quite different from the physical characteristics of any particles present in the homogeneous, single-phase overbased material which is subjected to the conversion. Particularly, such physical characteristics as particle size and structure are quite different. The solid, metal-containing particles of the colloidal disperse systems are of a size sufficient for detection by X-ray diffraction. The overbased material prior to conversion are not characterized by the presence of these detectable particles.

X-ray diffraction and electron microscope studies have been made of both overbased organic materials and colloidal disperse systems prepared therefrom. These studies establish the presence in the disperse systems of the solid, metal-containing salts. For example, in the disperse system prepared herein above, the calcium carbonate is present as solid calcium carbonate having a particle size of about 40 to 50 A. (unit particle size) and interplanar spacing (dA.) of 3.035. But X-ray diffraction studies of the overbased material from which it was prepared indicate the absence of calcium carbonate of this type. In fact, calcium carbonate present as such, if any, appears to be amorphous and in solution. While applicant does not intend to be bound by any theory offered to explain the changes which accompany the conversion step, it appears that conversion permits particle formation and growth. That is, the amorphous, metal-containing apparently dissolved salts or complexes present in the overbased material form solid, metal-containing particles which by a process of particle growth become colloidal particles. Thus, in the above example, the dissolved amorphous calcium carbonate salt or complex is transformed into solid particles which then "grow." In this example, they grow to a size of 40 to 50 A. In many cases, these particles apparently are crystallites. Regardless of the correctness of the postulated mechanism for in situ particle formation the fact remains that no particles of the type predominant in the disperse systems are found in the overbased materials from which they are prepared. Accordingly, they are unquestionably formed in situ during conversion.

As these solid metal-containing particles formed in situ come into existence, they do so as pre-wet, pre-dispersed solid particles which are inherently uniformly distributed throughout the other components of the disperse system. The liquid disperse medium containing these pre-wet dispersed particles is readily incorporated into various polymeric compositions thus facilitating the uniform distribution of the particles throughout the polymeric resin composition. This pre-wet, pre-dispersed character of the solid metal-containing particles resulting from their in situ formation is, thus, an extremely important feature of the disperse systems.

In the foregoing example, the third component of the disperse system (i.e., the organic compound which is soluble in the disperse medium and which is characterized by molecules having a hydrophobic portion and a polar substituent) is calcium petrosulfonate,

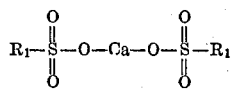

wherein $R_1$ is the residue of the petrosulfonic acid. In this case, the hydrophobic portion of the molecule is the hydrocarbon moiety of petrosulfonic, i.e., —$R_1$. The polar substituent is the metal salt moiety,

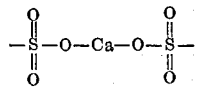

The hydrophobic portion of the organic compound is a hydrocarbon radical or a substantially hydrocarbon radical containing at least about twelve aliphatic carbon atoms. Usually the hydrophobic portion is an aliphatic or cycloaliphatic hydrocarbon radical although aliphatic or cycloaliphatic substituted aromatic hydrocarbon radicals are also suitable. In other words, the hydrophobic portion of the organic compound is the residue of the organic material which is overbased minus its polar substituents. For example, if the material to be overbased is a carboxylic acid, sulfonic acid, or phosphorus acid, the hydrophobic portion is the residue of these acids which would result from the removal of the acid functions. Similarly, if the material to be overbased is a phenol, a nitro-substituted polyolefin, or an amine, the hydrophobic portion of the organic compound is the radical resulting from the removal of the hydroxyl, nitro, or amino group respectively. It is the hydrophobic portion of the molecule which renders the organic compound soluble in the solvent used in the overbasing process and later in the disperse medium.

Obviously, the polar portion of these organic compounds are the polar substituents such as the acid salt moiety discussed above. When the material to be overbased contains polar substituents which will react with the basic metal compound used in overbasing, for example, acid groups such as carboxy, sulfino, hydroxysulfonyl, and phosphorus acid groups or hydroxyl groups, the polar substituent of the third component is the polar group formed from the reaction. Thus, the polar substituent is the corresponding acid metal salt group or hydroxyl group metal derivative, e.g., an alkali or alkaline earth metal sulfonate, carboxylate, sulfinate, alcoholate, or phenate.

On the other hand, some of the materials to be overbased contained polar substituents which ordinarily do not react with metal bases. These substituents include nitro, amino, ketocarboxyl, carboalkoxy, etc. In the disperse systems derived from overbased materials of this type the polar substituents in the third component are unchanged from their identity in the material which was originally overbased.

The identity of the third essential component of the disperse system depends upon the identity of the starting materials (i.e., the material to be overbased and the metal base compound) used in preparing the overbased material. Once the identity of these starting materials is known, the identity of the third component in the colloidal disperse system is automatically established. Thus, from the identity of the original material, the identity of the hydrophobic portion of the third component in the disperse system is readily established as being the residue of that material minus the polar substituents attached thereto. The identity of the polar substituents on the third component is established as a matter of chemistry. If the polar groups on the material to be overbased undergo reaction with the metal base, for example, if they are acid functions, hydroxy groups, etc., the polar substituent in the final product will correspond to the reaction product of the original substituent and the metal base. On the other hand, if the polar substituent in the material to be overbased is one which does not react with metal bases, then the polar substituent of the third component is the same as the original substituent.

As previously mentioned, this third component can orient itself around the metal-containing particles to form micellar colloidal particles. Accordingly, it can exist in the disperse system as an individual liquid component dissolved in the disperse medium or it can be associated with the metal-containing particles as a component of micellar colloidal particles.

The following examples illustrate various overbased materials, and colloidal disperse systems prepared from these overbased materials. Unless otherwise indicated, "percentages" and "parts" refer to percent by weight and parts by weight. The term "naphtha" as used in the following examples refers to petroleum distillates boiling in the range of about 90° C. to about 150° C. and usually designated Varnish Maker's and Painter's Naphtha.

Example 1

To a mixture of 3,245 grams (12.5 equivalents) of a mineral oil solution of barium petroleum sulfonate (sulfate ash of 7.6%), 32.5 parts of octylphenol, 197 parts of water, there is added 73 parts of barium oxide within a period of 30 minutes at 57°–84° C. The mixture is heated at 100° C. for one hour to remove substantially all water and blown with 75 parts of carbon dioxide at 133° to 170° C. within a period of 3 hours. A mixture of 1,000 grams of the above carbonated intermediate product, 121.8 parts of octylphenol, and 234 parts of barium hydroxide is heated at 100° C. and then at 150° C. for 1 hour. The mixture is then blown with carbon dioxide at 150° C. for 1 hour at a rate of 3 cubic feet per hour. The carbonated product is filtered and the filtrate is found to have a sulfate ash content of 39.8% and a metal ratio of 9.3.

Example 2

To a mixture of 3,245 grams (12.5 equivalents) of barium petroleum sulfonate, 1,460 grams (7.5 equivalents) of heptylphenol, and 2,100 grams of water in 8,045 grams of mineral oil there is added at 180° C. 7,400 grams (96.5 equivalents) of barium oxide. The addition of barium oxide causes the temperature to rise to 143° C. which temperature is maintained until all the water has been distilled. The mixture is then blown with carbon dioxide until it is substantially neutral. The product is diluted with 5,695 grams of mineral oil and filtered. The filtrate is found to have a barium sulfate ash content of 30.5% and a metal ratio of 8.1. Another inert liquid such as benzene, toluene, heptene, etc., can be substituted for all or part of the mineral oil.

Example 3

A mixture of 1,285 grams (1.0 equivalent) of 40% barium petroleum sulfonate and 500 milliliters (12.5 equivalents) of methanol is stirred at 55–60° C. while 301 grams (3.9 equivalents) of barium oxide is added portionwise over a period of 1 hour. The mixture is stirred an additional 2 hours at 45–55° C., then treated with carbon dioxide at 55–65° C. for 2 hours. The resulting mixture is freed of methanol by heating to 150° C. The residue is filtered through a siliceous filter aid, the clear, brown filtrate analyzing as: sulfate ash, 33.2%; slightly acid; metal ratio, 4.7.

Example 4

A stirred mixture of 57 grams (0.4 equivalent) of nonyl alcohol and 3.01 grams (3.9 equivalents) of barium oxide is heated at 150–175° C. for an hour, then cooled to 80° C. whereupon 400 grams (12.5 equivalents) of methanol is added. The resultant mixture is stirred at 70–75° C. for 30 minutes, then treated with 1,285 grams (1.0 equivalent) of 40% barium petroleum sulfonate. This mixture is stirred at reflux temperature for an hour, then treated with carbon dioxide at 60–70° C. for 2 hours. The mixture is then heated to 160° C. at a pressure of 18 millimeters of mercury and thereafter filtered. The filtrate is a clear, brown oily material having the following analysis: sulfate ash, 32.5%; neutralization number, nil; metal ratio, 4.7.

Example 5

(a) To a mixture of 1,145 grams of a mineral oil solution of a 40% solution of barium mahogany sulfonates (1.0 equivalent) and 100 grams of methyl alcohol at 55° C., there is added 220 grams of barium oxide while the mixture is being blown with carbon dioxide at a rate of 2 to 3 cubic feet per hour. To this mixture there is added an additional 78 grams of methyl alcohol and then 460 grams of barium oxide while the mixture is blown with carbon dioxide. The carbonated product is heated to 150° C. for 1 hour and filtered. The filtrate is found to have a barium sulfate ash content of 53.8% and a metal ratio of 8.9.

(b) A carbonated basic metal salt is prepared in accordance with the procedure of (a) except that a total of 16 equivalents of barium oxide is used per equivalent of the barium mahogany sulfonate. The product possesses a metal ratio of 13.4.

Example 6

A mixture of 520 parts (by weight) of a mineral oil, 480 parts of a sodium petroleum sulfonate (molecular weight of 480), and 84 parts of water is heated at 100° C. for 4 hours. The mixture is then heated with 86 parts of a 76% aqueous solution of calcium chloride and 72 parts of lime (90% purity) at 100° C. for 2 hours, dehydrated by heating to a water content of less than 0.5%, cooled to 50° C., mixed with 130 parts of methyl alcohol, and then blown with carbon dioxide at 50° C. until substantially neutral. The mixture is then heated to 150° C. to remove the methyl alcohol and water and the resulting oil solution of the basic calcium sulfonate filtered. The filtrate is found to have a calcium sulfate ash content of 16% and a metal ratio of 2.5.

A mixture of 1,305 grams of the above carbonated calcium sulfonate, 930 grams of mineral oil, 220 grams of methyl alcohol, 72 grams of isobutyl alcohol, and 38 grams of primary amyl alcohol is prepared, heated to 35° C., and subjected to the following operating cycle 4 times: mixing with 143 grams of 90% calcium hydroxide and treating the mixture with carbon dioxide until it has a base number of 32–39. The resulting product is then heated to 155° C. during a period of 9 hours to remove the alcohols and filtered through a siliceous filter aid at this temperature. The filtrate has a calcium sulfate ash content of 39.5% and a metal ratio of 12.2.

Example 7

A basic metal salt is prepared by the procedure described in Example 6 except that the slightly basic calcium sulfonate having a metal ratio of 2.5 is replaced with a mixture of that calcium sulfonate (280 parts by weight) and tall oil acid (970 parts by weight having an equivalent weight of 340) and that the total amount of calcium hydroxide used is 930 parts by weight. The resulting highly basic metal salt of the process has a calcium sulfate ash content of 48%, a metal ratio of 7.7, and an oil content of 31%.

Example 8

A highly basic metal salt is prepared by the procedure of Example 7 except that the slightly basic calcium sulfonate starting material having a metal ratio of 2.5 is replaced with tall oil acids (1,250 parts by weight, having an equivalent weight of 340) and the total amount of calcium hydroxide used is 772 parts by weight. The resulting highly basic metal salt has a metal ratio of 5.2, a calcium sulfate ash content of 41%, and an oil content of 33%.

Example 9

A normal calcium mahogany sulfonate is prepared by metathesis of a 60% oil solution of sodium mahogany sulfonate (750 parts by weight) with a solution of 67 parts of calcium chloride and 63 parts of water. The reaction mass is heated for 4 hours at 90 to 100° C. to effect the conversion of the sodium mahogany sulfonate to calcium mahogany sulfonate. Then 54 parts of lime is added and the whole is heated to 150° C. over a period of 5 hours. When the whole has cooled to 40° C., 98 parts of methanol is added and 152 parts of carbon dioxide is introduced over a period of 20 hours at 42–43° C. Water and alcohol are then removed by heating the mass to 150° C. The residue in the reaction vessel is diluted with 100 parts of low viscosity mineral oil. The filtered oil solution of the desired carbonated calcium sulfonate overbased material shows the following analysis: sulfate ash content, 16.4%; neutralization number, 0.6 (acidic); and a metal ratio of 2.50. By adding barium or calcium oxide or hydroxide to this product with subsequent carbonation, the metal ratio can be increased to a ratio of 3.5 or greater as desired.

Example 10

A mixture of 880 grams (0.968 mole) of a 57.5% oil solution of the calcium sulfonate of tridecylbenzene bottoms (the bottoms constitute a mixture of mono-, di-, and tri-decylbenzene), 149 grams of methanol, and 59 grams (1.58 equivalents) of calcium hydroxide are introduced into a reaction vessel and stirred vigorously. The whole is heated to 40–45° C. and carbon dioxide is introduced for 0.5 hour at the rate of 2 cubic feet per hour. The carbonated reaction mixture is then heated to 150° C. to remove alcohol and any water present, and the residue is filtered for purposes of purification. The product, a 61% oil solution of the desired overbased carbonated calcium sulfonate material shows the following analysis: ash content, 16.8%; neutralization number, 7.0 (acidic); and metal ratio, 2.42. By further carbonation in the presence of an alkali or alkaline earth metal oxide, hydroxide, or alkoxide, the metal ratio can readily be increased to 3.5 or greater.

Example 11

A mixture of 2,090 grams (2.0 equivalents) of a 45% oil solution of calcium mahogany sulfonate containing 1% of water, 74 grams (2.0 equivalents) of calcium hydroxide, and 251 grams of ethylene glycol is heated for 1 hour at 100° C. Carbon dioxide is then bubbled through the mixture at 40–45° C. for 5.5 hours. The ethylene glycol and any water present are removed by heating the mixture to a temperature of 185° C. at 10.2 millimeters of mercury. The residue is filtered yielding the desired overbased calcium sulfonate material, having the following analysis: sulfate ash, 12.9%; neutralization number 5.0 (acidic); and a metal ratio of 2.0 which can be increased to 3.5 or greater as desired by carbonation in the presence of calcium oxide or hydroxide.

Example 12

A mixture comprising 1,595 parts of the overbased material of Example 9 (1.54 equivalents based on sulfonic acid anion), 167 parts of the calcium phenate prepared as indicated below (0.19 equivalent), 616 parts of mineral oil, 157 parts of 91% calcium hydroxide (3.86 equivalents), 288 parts of methanol, 88 parts of isobutanol, and 56 parts of mixed isomeric primary-amyl alcohols (containing about 65% normal amyl, 3% isoamyl and 32% of 2-methyl-1-butyl alcohols) is stirred vigorously at 40° C. and 25 parts of carbon dioxide is introduced over a period of 2 hours at 40–50° C. Thereafter, three additional portions of calcium hydroxide, each amounting to 1.57 parts, are added and each such addition is followed by the introduction of carbon dioxide as previously illustrated. After the fourth calcium hydroxide addition and the carbonation step is completed, the reaction mass is carbonated for an additional hour at 43–47° C. to reduce neutralization number of the mass to 4.0 (basic). The substantially neutral, carbonated reaction mixture is freed from alcohol and any water of reaction by heating to 150° C. and simultaneously blowing it with nitrogen. The residue in the reaction vessel is filtered. The filtrate, an oil solution of the desired substantially neutral, carbonated calcium sulfonate overbased material of high metal ratio, shows the following analysis: sulfate ash content, 41.11%; neutralization number 0.9 (basic); and a metal ratio of 12.55.

The calcium phenate used above is prepared by adding 2,250 parts of mineral oil, 960 parts (5 moles) of heptylphenol, and 50 parts of water into a reaction vessel and stirring at 25° C. The mixture is heated to 40° C. and 7 parts of calcium hydroxide and 231 parts (7 moles) of 91% commercial paraformaldehyde is added over a period of 1 hour. The whole is heated to 80° C. and 200 additional parts of calcium hydroxide (making a total of 207 parts or 5 moles) is added over a period of 1 hour at 80–90° C. The whole is heated to 150° C. and maintained at that temperature for 12 hours while nitrogen is blown through the mixture to assist in the removal of water. If foaming is encountered, a few drops of polymerized dimethyl silicone foam inhibitor may be added to control the foaming. The reaction mass is then filtered. The filtrate, a 33.6% oil solution of the desired calcium phenate of heptylphenol-formaldehyde condensation product is found to contain 7.56% sulfate ash.

Example 13

A mixture of 574 grams (0.5 equivalent) of 40% barium petroleum sulfonate, 98 grams (1.0 equivalent) of furfuryl alcohol, and 762 grams of mineral oil is heated with stirring at 100° C. for an hour, then treated portion-wise over a 15-minute period with 230 grams (3.0 equivalents) of barium oxide. During this latter period, the temperature rises to 120° C. (because of the exothermic nature of the reaction of barium oxide and the alcohol). The mixture then is heated to 150–160° C. for an hour, and treated subsequently at this temperature for 1.5 hours with carbon dioxide. The material is concentrated by heating to a temperature of 150° C. at a pressure of 10 millimeters of mercury and thereafter filtered to yield a clear, oil-soluble filtrate having the following analysis: sulfate ash content, 21.4%; neutralization number, 2.6 (basic); and a metal ratio of 6.1.

Example 14

An overbased material is prepared by the procedure of Example 6 except that the slightly basic calcium sulfonate starting material has a metal ratio of 1.6 and the amount of this calcium sulfonate used is 1,050 parts (by weight) and that the total amount of lime used is 630 parts. The resulting metal salt has a calcium sulfate ash content of 40%, a ratio of the inorganic metal group to the bivalent bridging group of 16, and an oil content of 35%.

Example 15

To a mixture of 1,614 parts (3 equivalents) of a polyisobutenyl succinic anhydride (prepared by the reaction of a chlorinated polyisobutene having an average chlorine content of 4.3% and an average of 67 carbon atoms with maleic anhydride at about 200° C.), 4,313 parts of mineral oil, 345 parts (1.8 equivalents) of heptylphenol, and 200 parts of water, at 80° C., there is added 1,038 parts (24.7 equivalents) of lithium hydroxide monohydrate over a period of 0.75 hour while heating to 105° C. Isooctanol (75 parts) is added while the mixture is heated to 150° C. over a 1.5-hour period. The mixture is maintained at 150–170° C. and blown with carbon dioxide at rate of 4 cubic feet per hour for 3.5 hours. The reaction mixture is filtered through a filter aid and the filtrate is the desired product having a sulfate ash content of 18.9% and a metal ratio of 8.0.

Example 16

The procedure of Example 6 is repeated except that an equivalent amount of sodium hydroxide is used in lieu of the calcium oxide. The product is the corresponding sodium overbased material.

Example 17

A mixture of 244 parts (0.87 equivalent) of maleic acid, 180 parts of primary isooctanol, and 400 parts of mineral oil is heated to 70° C. whereupon 172.6 parts (2.7 equivalents) of cadmium oxide is added. The mixture is heated for 3 hours at a temperature of 150° to 160° C. while removing water. Barium hydroxide monohydrate (324 parts, 3.39 equivalents) is then added to the mixture over a period of 1 hour while continuing to remove water by means of a side-arm water trap. Carbon dioxide is blown through the mixture at a temperature of from 150°–160° C. until the mixture is slightly acidic to phenolphthalein.

Upon completion of the carbonation, the mixture is stripped to a temperature of 150° C. at 35 mm. of mercury to remove substantially all the remaining water and alcohol. The residue is the desired overbased product containing both barium and cadmium metal.

Example 18

The procedure of Example 13 is repeated except that the barium sulfonate is replaced by an equivalent amount of potassium sulfonate, and potassium oxide is used in lieu of the barium oxide resulting in the preparation of the corresponding potassium overbased material.

Example 19

A sulfoxide is prepared by treating polyisobutylene (average molecular weight 750) with 47.5% of its weight of $SOCl_2$ for 4.5 hours at 220° C. A mixture of 787 grams (1.0 equivalent) of this sulfoxide, 124 grams (0.6 equivalent) of diisobutylphenol, 550 grams of mineral oil, and 200 grams of water was warmed to 70° C. and treated with 360 grams (4.0 equivalents) of barium oxide. This mixture is heated at reflux temperature for 1 hour and treated at 150° C. with carbon dioxide until the mixture is substantially neutral and thereafter filtered to yield a clear, oil-soluble liquid having the following analysis: sulfate ash, 22.8%; neutralization number, 5.8 (basic); and metal ratio, 5.8.

Example 20

To a mixture of 268 grams (1.0 equivalent) of oleyl alcohol, 675 grams of mineral oil, 124 grams (0.6 equivalent) of diisobutylphenol, and 146 grams of water, at 70° C. there is added 308 grams (4.0 equivalents) of barium oxide. This mixture is heated at reflux temperature for 1 hour, then at 150° C. while bubbling carbon dioxide therethrough until substantial neutrality of the mixture is achieved. The resulting reaction mass is filtered resulting in a clear, brown, oil-soluble filtrate having the following analysis: sulfate sash content, 29.8%; neutralization number 2.6 (basic); and metal ratio, 6.0.

Example 21

To a mixture of 423 grams (1.0 equivalent) of sperm oil, 124 grams (0.6 equivalent) of heptylphenol, 500 grams of mineral oil, and 150 grams of water there are added at 70° C. 308 grams (4.0 equivalents) of barium oxide. This mixture is heated at reflux temperature for 1 hour, dried by heating at about 150° C. and thereafter carbonated by treatment with carbon dioxide at the same temperature until the reaction mass was slightly acidic. Filtration yields a clear, light brown, non-viscous overbased liquid material having the following analysis: sulfate ash content, 32.0%; neutralization number 0.5 (basic); metal ratio, 6.5.

To a mixture of 174 grams (1.0 equivalent) of N-octa-

Example 22 decyl propylene diamine, 124 grams (0.6 equivalent) of diisobutylphenol, 766 grams of mineral oil, 146 grams of water, there are added 306 grams (4.0 equivalents) of barium oxide and the whole is refluxed for an hour. Water is subsequently removed by raising the temperature to 150° C. and thereafter carbon dioxide is bubbled therethrough while maintaining this temperature. When the reaction mass is substantially neutral, carbon dioxide addition is ceased and the reaction mass filtered producing a clear, oil-soluble liquid having the following analysis: sulfate ash content, 28.9%; neutralization number, 2.5 (basic); metal ratio, 5.8.

Example 23

A mixture of 6,000 grams of a 30% solution of barium petroleum sulfonate (sulfate ash 7.6%), 348 grams of para-tertiary butylphenol, and 2911 grams of water is heated to a temperature 60° C. while slowly adding 1100 grams of barium oxide and raising the temperature to 94– 98° C. The temperature is held within this range for about 1 hour and then slowly raised over a period of 7½ hours to 150° C. and held at this level for an additional hour assuring substantial removal of all water. The resulting overbased material is a brown liquid having the following analysis: Sulfate ash content, 26.0%; metal ratio, 4.35.

This product is then treated with $SO_2$ until 327 grams of the mass combined with the overbased material. The product thus obtained has a neutralization number of zero. The $SO_2$-treated material was liquid and brown in color.

One thousand grams of the $SO_2$-treated overbased material produced according to the preceding paragraph is mixed with 286 grams of water and heated to a temperature of about 60° C. Subsequently, 107.5 grams of barium oxide are added slowly and the temperature is maintained at 94–98° C. for 1 hour. Then the total reaction mass is heated to 150° C. over a 1⅙ hour period and held there for a period of 1 hour. The resulting overbased material is purified by filtration, the filtrate being the brown, liquid overbased material having the following analysis: sulfate ash content, 33.7%; basic number, 38.6; metal ratio, 6.3.

Example 24

(a) A polyisobutylene having a molecular weight of 700–800 is prepared by the aluminum chloride-catalyzed polymerization of isobutylene at 0–30° C., is nitrated with a 10% excess (1.1 moles) of 70% aqueous nitric acid at 70–75° C. for 4 hours. The volatile components of the product mixture are removed by heating to 75° C. at a pressure of 75 mm. of mercury. To a mixture of 151 grams (0.19 equivalent) of this nitrated polyisobutylene, 113 grams (0.6 equivalent) of heptylphenol, 155 grams of water, and 2,057 grams of mineral oil there is added at 70° C. 612 grams (8 equivalents) of barium oxide. This mixture is heated at 150° C. for an hour, then treated with carbon dioxide at this same temperature until the mixture is neutral (phenolphthalein indicator; ASTM D-974-53T procedure at 25° C.; a measurement of the degree of conversion of the metal reactant, i.e., barium oxide, bicarbonation). The product mixture is filtered and the filtrate found to have the following analysis: sulfate ash content, 27.6%; percent N, 0.06; and metal ratio, 9.

(b) A mixture of 611 grams (0.75 mole) of nitrated polyisobutylene of Example 1, 96 grams (0.045 mole) of heptylphenol, 2104 grams of mineral oil, 188 grams of water and 736 grams (4.8 moles) of barium oxide was heated at reflux temperature for an hour. The water was vaporized and carbon dioxide passed into the mixture at 150° C. until the mixture was no longer basic. This carbonated mixture was filtered and the clear fluid filtrate showed the following analysis: Sulfate ash content, 26.3%; percent N, 0.15; base No. 2.4; metal ratio, 6.7.

Example 25

(a) A mixture of 1 equivalent of a nitrated polypropylene having a molecular weight of about 3,000, 2 equivalents of cetyl phenol, mineral oil, and 3 equivalents of barium hydroxide is heated at reflux temperature for 1 hour. The temperature is then raised to 150° C. and carbon dioxide is bubbled through the mixture at this temperature. The reaction product is filtered and the filtrate is the desired overbased material.

(b) A solvent-refined, acid-treated Pennsylvania petroleum lubricating oil is nitrated by treatment with 1.5 moles of 70% aqueous nitric acid at 54–78° C. for 8 hours. After removal of volatile components of the product mixture by heating at 103° C. at a pressure of 15 mm. of mercury for 2 hours, a 787 gram portion (1.0 equivalent) of the nitrated product is treated with 2 grams (0.3 equivalent) of heptylphenol, 495 grams of mineral oil, 90 grams of water, and 378 grams (5 equivalents) of barium oxide. This mixture is heated at reflux temperature for an hour, then freed of water by distillation. The temperature is increased to 150° C. whereupon carbon dioxide is bubbled into the mixture until it is neutral. Filtration yields a clear filtrate with the following analysis: percent sulfate ash, 27.6; percent N, 0.5; and metal ratio, 3.1.

Example 26

(a) A mixture of 1,000 parts of mineral oil, 2 equivalents of barium hydride, 1 equivalent of 1-nitro-3-octadecyl-cyclohexane and 1 equivalent (i.e., 0.5 mole) of 4,4'-methylene-bis(heptylphenol) is carbonated at 100–150° C. for 4 hours until the reaction mixture is substantially neutral to phenolphthalein indicator. The reaction mass is filtered and the desired product is the filtrate.

(b) A mixture of 1,000 parts of mineral oil, 3 equivalents of lithium hydroxide, 1 equivalent of nitrated polyisobutene (prepared by mixing 500 parts by weight of polyisobutene having an average molecular weight of 1,000 and 62.5 parts of 67% aqueous nitric acid at 65–70° C. for 11 hours) and para-butylphenol (1 equivalent) is carbonated according to the technique of (a) above to produce the corresponding lithium overbased material.

Example 27

A copolymer of isobutene and piperylene (weight ratio of 98.2) having a molecular weight of about 2,000, is nitrated by the procedure used in the preceding example for the nitration of polyisobutene. An overbased product is then prepared from this nitrated reactant by mixing 1 equivalent thereof with 1 equivalent of $\alpha$-butyl-$\beta$-naphthol and 7 equivalents barium hydroxide, diluting the mixture with mineral oil to a 50% oil mixture, and then carbonating the mixture at 120°–160° C. until it is substantially neutral to phenolphthalein indicator. The reaction product is filtered and the filtrate is the desired overbased product.

Example 28

A mixture of 630 grams (2 equivalents) of a rosin amine (consisting essentially of dehydroabietyl amine) having a nitrogen content of 44% and 245 grams (1.2 equivalents) of heptylphenol having a hydroxyl content of 8.3% is heated to 90° C. and thereafter mixed with 230 grams (3 equivalents) of barium oxide at 90–140° C. The mixture is purged with nitrogen at 140° C. A 600 gram portion is diluted with 400 grams of mineral oil and filtered. The filtrate is blown with carbon dioxide, diluted with benzene, heated to remove the benzene, mixed with xylene, and filtered. The filtrate, a 20% xylene solution of the product has a barium sulfate ash content of 25.1%, a nitrogen content of 2%, and a reflux base number of 119. (The basicity of the metal composition is expressed in terms of milligrams of KOH which are equivalent to one gram of the composition.) For convenience, the basicity thus determined is referred to in the specification as a "reflux base number."

Example 29

An amine-aldehyde condensation product is obtained as follows: formaldehyde (420 grams, 4 moles) is added in small increments to a mixture comprising N-octadecyl-propylenediamine (1,392 grams, 4 moles), mineral oil (300 grams), water (200 grams), and calcium hydroxide (42 grams—condensation catalyst) at the reflux temperature, i.e., 100°–105° C. The rate of addition of formaldehyde is such as to avoid excessive foaming. The mixture is heated at reflux temperature for 1 hour, slowly heated to 155° C., and blown with nitrogen at 150°–155° C. for 2 hours to remove all volatile components. It is then filtered. The filtrate, 93% of the theoretical yield, is a 65.4% oil solution of the amine-aldehyde condensation product having a nitrogen content of 2.4%.

A 1,850 gram portion (3.2 equivalents of nitrogen) is mixed with 1,850 grams of heptylphenol (0.97 equivalents), 1,485 grams of mineral oil, and 1,060 grams of 90% pure barium oxide (12.6 equivalents) and heated to 70° C. Over a period of 1 hour, 500 grams of water is added while maintaining the temperature in the range of 70–100° C. The mixture is heated at 110° to 15° C. for 4.7 hours and thereafter to 150° C. While maintaining the temperature within the range of 140–150° C., the reaction mixture is carbonated and subsequently filtered. The filtrate is a 57.8% oil solution of the overbased amine-aldehyde condensation product having a nitrogen content of 0.87% and a barium sulfate ash content of 29.5%.

Example 30

A partially acylated polyamine reactant is prepared as follows: a mixture (565 parts by weight) of an akylene amine mixture consisting of triethylene tetramine and diethylene triamine in weight ratio of 3:1 is added at 20°–80° C. to a mixture of naphthenic acid having an acid number of 180 (1,270 parts) and oleic acid (1,110 parts). The total quantity of the two acids used is such as to provide 1 equivalent of acid for each two equivalents of the amine mixture used. The reaction is exothermic. The mixture is blown with nitrogen while it is being heated to 240° C. in 4.5 hours and thereafter heated at this temperature for 2 hours. Water is collected as the distillate.

To the above residue, ethylene oxide (140 parts) is added at 170°–180° C. within a period of 2 hours while nitrogen is bubbled through the reaction mixture. Nitrogen blowing is continued for an additional 15 minutes and the reaction mixture then diluted with 940 parts of xylene to a solution containing 25% by weight of xylene to a solution containing 25% by weight of xylene. The resulting solution has a nitrogen content of 5.4% and a base number of 82 at pH of 4, the latter being indicative of free amino groups.

A 789 gram portion of the above xylene solution (3 equivalents of nitrogen) is heated to 150° C. at a pressure of 2 millimeters of mercury to distill off xylene and is then mixed with 367 grams of heptylphenol (having a hydroxyl content of 8.3%; 1.8 equivalents). To this mixture there is added 345 grams (4.5 equivalents) of barium oxide in small increments at 90°– 111° C. The mixture is heated at 90°–120° C. for 2.5 hours and blown with carbon dioxide for 1.75 hours. It is diluted with 130 grams of xylene and then heated at 150° C. for 3.5 hours. It is then diluted with 20% by weight of xylene and filtered. The filtrate has a barium sulfate ash content of 33.2%, a nitrogen content of 3.52% and a reflux base number of 134.

Example 31

To a mixture of 408 grams (2 equivalents) of heptylphenol having a hydroxyl content of 8.3% and 264 grams of xylene there is added 383 grams (5 equivalents) of barium oxide in small increments at 85°–110° C. Thereafter, 6 grams of water is added and the mixture is carbonated at 100°–130° C. and filtered. The filtrate is heated to 100° C. diluted with xylene to a 25% xylene solution. This solution has a barium sulfate ash content of 41% and a reflux base number of 137.

Example 32

A mixture of 5846 parts (4.0 equivalents) of a neutral calcium sulfonate having a calcium sulfate ash content of 4.68% (66% mineral oil), 464 parts (2.4 equivalents) of heptylphenol, and 3.4 parts of water is heated to 80° C. whereupon 1,480 parts (19.2 equivalents) of barium oxide is added over a period of 0.6 hour. The reaction is exothermic and the temperature of the reaction mixture reaches 100° C. The mixture is heated to 150° C. and carbonated at this temperature. During the carbonation, 24 parts of barium chloride were added to the mixture. Oil was removed from the reaction mixture during the carbonation procedure. Carbonation is continued at this temperature until the mixture has a base number (phenolphthalein) of 80. Octyl alcohol (164 parts) and a filter aid are added to the mixture and the mixture is filtered while hot. The filtrate is the desired overbased barium bright stock sulfonate having a barium sulfate ash content of 26.42, a metal ratio of 4.6 and a reflux base number of 104.

Example 33

Following the procedure for preparing barium and calcium overbased sulfonates exemplified above, sodium mahogany sulfonate (0.26 equivalent), 1 equivalent of phenol, and 5.3 equivalents of strontium oxide are carbonated until the reaction mixture is almost neutral. The resulting overbased material is filtered, the filtrate being the desired product and having a metal ratio of 4.6.

Example 34

A barium overbased carboxylic acid is prepared by carbonating a mixture of 9.8 equivalents of barium hydroxide, 1 equivalent of heptylphenol, and 0.81 equivalent of a polyisobutene substituted succinic anhydride wherein the polyisobutenyl portion thereof has an average molecular weight of 1,000.

Example 35

A mixture of 1,000 parts by weight of a polyisobutene having a molecular weight of 1,000 and 90 parts of phosphorus pentasulfide is prepared at room temperature, heated to 260° C. over 5 hours, and maintained at this temperature for an additional 5 hours. The reaction mass is then cooled to 106° C. and hydrolyzed by treatment with steam at this temperature for 5 hours. The hydrolyzed acid has a phosphorus content of 2.4%, a sulfur content of 2.8%. In a separate vessel, a mixture of oil and barium hydroxide is prepared by mixing 2,200 parts of a mineral oil and 1150 parts of barium oxide at 88° C. and blowing the mixture with steam for 3 hours at 150° C. To this mixture there is added portionwise throughout a period of 3 hours, 1,060 parts of the above hydrolyzed acid while maintaining the temperature at 145°–150° C., and then 360 parts of heptylphenol is added over a 1.5 hour period. The resulting mixture is blown with carbon dioxide at the rate of 100 parts per hour for 3 hours at 150–157° C. The carbonated product is mixed with 850 parts of a mineral oil and dried by blowing it with nitrogen at a temperature of 150° C. The dry product is filtered and the filtrate is diluted with mineral oil to a solution having a barium sulfate ash content of 25%. The final solution has a phosphorus content of 0.38%, a sulfur content of 0.48%, a neutralization number less than 5 (basic), a reflux base number of 109, and a metal ratio of 7.2.

Example 36

(a) To a mixture of 268 grams (1.0 equivalent) of oleyl alcohol, 124 grams (0.6 equivalent) of heptylphenol, 988 grams of mineral oil, and 160 grams of water there is added 168 grams (4.0 equivalents) of lithium hydroxide monohydrate. The mixture is heated at reflux temperature for an hour and then carbonated at 150° C. until it is substantially neutral. The filtration of this carbonated mixture yields a liquid having a lithium sulfate content of 12.7%.

(b) To a mixture of 1,614 parts (3 equivalents) of a polyisobutenyl succinic anhydride prepared by the reaction of a chlorinated polyisobutene having an average chlorine content of 4.3% and an average of 67 carbon atoms with maleic anhydride at about 200° C., 4,313 parts of mineral oil, 345 parts (1.8 equivalents) of heptylphenol, and 200 parts of water, at 80° C., there is added 1,038 parts (24.7 equivalents) of lithium hydroxide monohydrate over a period of 0.75 hour while heating to 105° C. Isooctanol (75 parts) is added while the mixture is heated to 150° C. in about 1.5 hours. The mixture is maintained at 150–170° C. and blown with carbon dioxide at the rate of 4 cubic feet per hour for 3.5 hours. The reaction mixture is filtered through a filter aid and the filtrate is the desired product having a sulfate ash content of 18.9 and a metal ratio of 8.

Example 37

A thiophosphorus acid is prepared as set forth in Example 35 above. A mixture of 890 grams of this acid (0.89 equivalent), 2,945 grams of mineral oil, 445 grams of heptylphenol (2.32 equivalents), and 874 grams of lithium hydroxide monohydrate (20.8 equivalents) formed by adding the metal base to the mineral oil solution of the acid and the heptylphenol over a 1.5 hour period maintaining the temperature at 100°–110° C. and thereafter drying at 150° C. for 2 hours, carbon dioxide is bubbled therethrough at the rate of 4 cubic feet per hour until the reaction mixture was slightly acidic to phenolphthalein, about 3.5 hours, while maintaining the temperature within the range of 150–160° C. The reaction mixture is then filtered twice through a diatomaceous earth filter. The filtrate is the desired lithium overbased thio-phosphorus acid material having a metal ratio of 6.3.

Example 38

(a) A reaction mixture comprising 2,442 grams (2.8 equivalents) of strontium petrosulfonate, 3,117 grams of mineral oil, 150 grams of isooctanol, and 910 grams of methanol is heated to 55° C. and thereafter 615 grams of strontium oxide (11.95 equivalents) is added over a 10 minute period while maintaining the reaction at a temperature of 55°–65° C. The mixture is heated an additional hour at this same temperature range and thereafter blown with carbon dioxide at a rate of 4 cubic feet per hour for about 3 hours until the reaction mixture was slightly acidic to phenolphthalein. Thereafter the reaction mixture is heated to 160° C. and held there for about 1 hour while blowing the nitrogen at 5 cubic feet per hour. Thereafter, the product is filtered, the filtrate being the desired overbased material having a metal ratio of 3.8.

(b) To a mixture of 3,800 parts (4 equivalents) of a 50% mineral oil solution of lithium petroleum sulfonate (sulfate ash of 6.27%), 460 parts (2.4 equivalents) of heptylphenol, 1,920 parts of mineral oil, and 300 parts of water, there is added at 70° C. 1,216 parts (28.9 equivalents) of lithium hydroxide monohydrate over a period of 0.25 hour. This mixture is stirred at 110° C. for 1 hour, heated to 150° C. over a 2.5 hour period, and blown with carbon dioxide at the rate of 4 cubic feet per hour over a period of about 3.5 hours until the reaction mixture is substantially neutral. The mixture is filtered and the filtrate is the desired product having a sulfate ash content of 25.23% and a metal ratio of 7.2.

Example 39

A mixture of alkylated benzene sulfonic acids and naphtha is prepared by adding 1,000 grams of a mineral oil solution of the acid containing 18% by weight mineral oil (1.44 equivalents of acid) and 222 grams of naphtha. While stirring the mixture, 3 grams of calcium chloride dissolved in 90 grams of water and 53 grams of Mississippi lime (calcium hydroxide) is added. This mixture is heated to 97–99° C. and held at this temperature for 0.5 hour. Then 80 grams of Mississippi lime are added to the reaction mixture with stirring and nitrogen gas is bubbled therethrough to remove water, while heating to 150° C. over a 3 hour period. The reaction mixture is then cooled to 50° C. and 170 grams of methanol are added. The resulting mixture is blown with carbon dioxide at the rate of 2 cubic feet per hour until substantially neutral. The carbon dioxide blowing is discontinued and the water and methanol stripped from the reaction mixture by heating and bubbling nitrogen gas therethrough. While heating to remove the water and methanol, the temperature rose to 146° C. over a 1.75 hour period. At this point the metal ratio of the overbased material was 2.5 and the product is a clear, dark viscous liquid. This material is permitted to cool to 50° C. and thereafter 1256 grams thereof is mixed with 574 grams of naphtha, 222 grams of methanol, 496 grams of Mississippi lime, and 111 grams of an equal molar mixture of isobutanol and amyl alcohol. The mixture is thoroughly stirred and carbon dioxide is blown therethrough at the rate of 2 cubic feet per hour for 0.5 hour. An additional 124 grams of Mississippi lime is added to the mixture with stirring and the $CO_2$ blowing continued. Two additional 124 gram increments of Mississippi lime are added to the reaction mixture while continuing the carbonation. Upon the addition of the last increment, carbon dioxide is bubbled through the mixture for an additional hour. Thereafter, the reaction mixture is gradually heated to about 146° C. over a 3.25 hour period while blowing with nitrogen to remove water and methanol from the mixture. Thereafter, the mixture is permitted to cool to room temperature and filtered producing 1,895 grams of the desired overbased material having a metal ratio of 11.3. The material contains 6.8% mineral oil, 4.18% of the isobutanol-amyl alcohol and 30.1% naphtha.

Example 40

A mixture of 406 grams of naphtha and 214 grams of amyl alcohol is placed in a three-liter flask equipped with reflux condenser, gas inlet tubes, and stirrer. The mixture is stirred rapidly while heating to 38° C. and adding 27 grams of barium oxide. Then 27 grams of water are added slowly and the temperature rises to 45° C. Stirring is maintained while slowly adding over 0.25 hour 73 grams of oleic acid. The mixture is heated to 95° C. with continued mixing. Heating is discontinued and 523 grams of barium oxide are slowly added to the mixture. The temperature rises to about 115° C. and the mixture is permitted to cool to 90° C. whereupon 67 grams of water are slowly added to the mixture and the temperature rises to 107° C. The mixture is then heated within the range of 107–120° C. to remove water over a 3.3 hour period while bubbling nitrogen through the mass. Subsequently, 427 grams of oleic acid is added over a 1.3 hour period while maintaining a temperature of 120°–125° C. Thereafter heating is terminated and 236 grams of naphtha is added. Carbonation is commenced by bubbling carbon dioxide through the mass at two cubic feet per hour for 1.5 hours during which the temperature is held at 108°–117° C. The mixture is heated under a nitrogen purge to remove water. The reaction mixture is filtered twice producing a filtrate analyzing as follows: sulfate ash content, 34.42%; metal ratio, 3.3. The filtrate contains 10.7% amyl alcohol and 32% naphtha.

Example 41

A reaction mixture comprising 1,800 grams of a calcium overbased petrosulfonic acid containing 21.7% by weight mineral oil, 36.14% by weight naphtha, 426 grams naphtha, 225 grams of methanol, and 127 grams of an equal molar amount of isobutanol and amyl alcohol are heated to 45° C. under reflux conditions and 148 grams of Mississippi lime (commercial calcium hydroxide) is added thereto. The reaction mass is then blown with carbon dioxide at the rate of 2 cubic feet per hour and thereafter 148 grams of additional Mississippi lime added. Carbonation is continued for another hour at the same rate. Two additional 147 gram increments of Mississippi lime are added to the reaction mixture, each increment followed by about a 1 hour carbonation process. Thereafter, the reaction mass is heated to a temperature of 138° C. while bubbling nitrogen therethrough to remove water and methanol. After filtration, 2,220 grams of a solution of the barium overbased petrosulfonic acid is obtained having a metal ratio of 12.2 and containing 12.5% by weight mineral oil, 34.15% by weight naphtha, and 4.03% by weight of the isobutanol amyl alcohol mixture.

Example 42

(a) Following the procedure of Example 2 above, the corresponding lead product is prepared by replacing the barium petrosulfonate with lead petroleum sulfonate (1 equivalent) and barium oxide with lead oxide (25 equivalents).

(b) Following the procedure of Example 5(a) above, the corresponding overbased sodium sulfonate is prepared by replacing the barium oxide with sodium hydroxide.

Example 43

(a) A mixture comprising 280 parts of a commercial mixture of fatty acids distilled from tall oil acids (sold as Acintol FA–1 Special by the Arizona Chemical Company and said to comprise about 44% linoleic acids, 52% oleic acids, and 4% saturated carboxylic acids), 1,123 parts of VM and P naphtha (Varnish Maker's and Painter's naphtha), 148 parts calcium hydroxide, and 67 parts methanol is carbonated at 50°–55° C. until the carbon dioxide uptake substantially ceases, that is, until the amount of carbon dioxide introduced into the mixture is substantially equal to the amount of carbon dioxide exiting the mixture. The carbonated mass is blown with nitrogen while the temperature is elevated to about 117° C. over a 1.75 hour period and thereafter filtered. The filtrate is a clear, dark amber liquid characterized by a sulfate ash content of about 14.5% and a metal ratio of about 3.3.

(b) A mixture comprising 282 parts of the carboxylic acid mixture described in (a), 876 parts boiled linseed oil, 175 parts methanol, 44 parts primary amyl alcohol, and 296 parts of calcium hydroxide is carbonated for about three hours while maintaining a temperature of 77°–79° C. at which time the carbon dioxide uptake has substantially ceased and the carbonated mass has a neutralization number (phenophthalein) of about 1.6 (basic). This carbonated mixture is blown with nitrogen for one hour while the temperature is elevated to 150° C. and is then held at about 150° C. for an additional hour with continued nitrogen blowing at which time 383 parts of xylene are added. The mixture containing xylene is held at about 10° C. for about 0.25° hour and filtered. The filtrate is a clear, dark amber solution of the desired carbonated, calcium-overbased carboxylic acid mixture (metal ratio of about 7.7) containing about 46% linseed oil and 20% xylene. It is characterized by a calcium sulfate ash content of about 27.5%.

(c) A mixture comprising 280 parts of the carboxylic acid mixture of (a), 1271 parts VM and P naphtha, 272 parts calcium hydroxide, and 140 parts methanol, is carbonated for about 0.75 hour at a temperature of 60°–65° C. Then 272 parts of calcium hydroxide are added and carbonation is continued for about 1.3 hours at 60°–65° C. at which point the carbon dioxide uptake has substantially ceased. The carbonated mixture is then blown with nitrogen while heating at 120° C. to remove water and methanol. It is then filtered at a temperature of about 115° C. The filtrate is a 60% naphtha solution of the desired carbonated, calcium-overbased carboxylic acid mixture (metal ratio about 9.9) and is characterized by a calcium sulfate ash content of 31.7%.

Following the general procedure of (c) above, a carbonated, calcium-overbased carboxylic acid mixture as described in (a) and having a metal ratio of about 14.5 is prepared as a clear, golden orange filtrate containing about 50% naphtha and characterized by a calcium sulfate ash content of about 45.6%. The process involves first neutralizing the carboxylic acids with a stoichiometrically equivalent amount of calcium hydroxide and then adding with carbonation two increments of calcium hydroxide, each providing about seven equivalents of calcium for each equivalent of acid.

Example 44

(a) A mixture of 520 parts mineral oil, 480 parts of a sodium salt of an alkylated benzene sulfonic acid (average molecular weight 480), and 84 parts of water is heated at about 100° C. for four hours. The mixture is then heated with 86 parts of a 76% aqueous solution of calcium chloride and 72 parts of lime (90% purity) at 100° C. for two hours, dehydrated by heating to a water content or less than 0.5%, cooled to 50° C., mixed with 130 parts of methyl alcohol, and then blown with carbon dioxide at 50° C. until substantially neutral. The resulting mixture is heated to 150° C. to remove methyl alcohol and water and the resulting oil solution of the basic calcium sulfonate filtered. The filtrate is characterized by a calcium sulfate ash content of 16% and a metal ratio of about 2.5. A mixture of 1305 parts of this filtrate, 930 parts of mineral oil, 220 parts of methyl alcohol, 72 parts of isobutyl alcohol, and 38 parts of amyl alcohol is heated to 35° C. and subjected to the following procedure four times: mixing with 143 parts of lime (90% calcium hydroxide) and treating the mixture with carbon dioxide until it has a base number of 32–39. The resulting carbonated mixture is heated to 155° C. during a period of nine hours to remove the alcohol and subsequently filtered. The filtrate is a mineral oil solution of the desired carbonated, calcium-overbased sulfonic acid salt (metal ratio about 12.2) characterized by a calcium sulfate ash content of about 39.5%.

(b) A carbonated, calcium-overbased metal salt is prepared according to the general procedure of Example 2(a) except that the slightly basic calcium sulfonate having a metal ratio of 2.5 is replaced with a mixture of that calcium sulfonate (280 parts weight) and tall oil acids (970 parts having an equivalent weight of 340) and the total amount of calcium hydroxide used is 930 parts. The filtrate is characterized by a calcium sulfate ash content of 48%, and an oil content of 31%. The carbonated, calcium-overbased acid salt mixture has a metal ratio of about 7.7.

(c) A carbonated, calcium-overbased organic acid salt prepared according to the general procedure of Example 2(a) except that the slightly basic calcium sulfonate starting material having a metal ratio of 2.5 is replaced with tall oil acids (1,250 parts having an equivalent weight of 340), and the total amount of calcium hydroxide is 772 parts. The acid salt thus produced has a metal ratio of 5.2. The filtrate is characterized by a calcium sulfate ash content of about 41% and an oil content of about 33%.

(d) A carbonated, calcium-overbased salt is prepared by the general procedure of Example 2(a) except that the slightly basic calcium sulfonate starting material is replaced with a mixture of that basic calcium sulfonate (555 parts) and tall oil acids (694 parts having an equivalent weight of 340) and the amount of calcium hydroxide used is 772 parts. The filtrate is a mineral oil solution of the desired overbased salt having a metal ratio of about 7.9 and is further characterized by sulfate ash content of about 45% and an oil content of about 32%.

The above examples illustrate various means for preparing overbased materials suitable for conversion to the non-Newtonian colloidal disperse systems utilized in the present invention. Obviously, it is within the skill of the art to vary these examples to produce any desired overbased material. Thus, other acidic materials such as mentioned hereinbefore can be substituted for the $CO_2$, $SO_2$, and acetic acid used in the above examples. Similarly, other metal bases can be employed in lieu of the metal base used in any given example. Or mixtures of bases and/or mixtures of materials which can be overbased can be utilized. Similarly, the amount of mineral oil or other non-polar, inert, organic liquid used as the overbasing medium can be varied widely both during overbasing and in the overbased product.

The following examples illustrate the conversion of the Newtonian overbased materials into non-Newtonian colloidal disperse systems by homogenization with conversion agents.

Example I

To 733 grams of the overbased materials of Example 5(a) there is added 179 grams of acetic acid and 275 grams of a mineral oil (having a viscosity of 2,000 SUS at 100° F.) at 90° C. in 1.5 hours with vigorous agitation. The mixture is then homogenized at 150° C. for 2 hours and the resulting material is the desired colloidal disperse system.

Example II

A mixture of 960 grams of the overbased material of Example 5(b), 256 grams of acetic acid, and 300 grams of a mineral oil (having a viscosity of 2000 SUS at 100° F.) is homogenized by vigorous stirring at 150° C. for 2 hours. The resulting product is a non-Newtonian colloidal disperse system of the type contemplated for use by the present invention.

The overbased materials of Examples I and II can be converted without the addition of additional mineral oil or if another inert organic liquid is substituted for the mineral oil.

Example III

A mixture of 150 parts of the overbased material of Example 6, 15 parts of methyl alcohol, 10.5 parts of amyl alcohol, and 45 parts of water is heated under reflux conditions at 71°–74° C. for 13 hours whereupon the mixture gels. The gel is heated for 6 hours at 144° C., diluted with 126 parts of the mineral oil of the type used in Example I above the diluted mixture heated to 144° C. for an additional 4.5 hours. The resulting thickened product is a colloidal disperse system. Again, it is not necessary that the material be diluted with mineral oil in order to be useful. The gel itself which results from the initial homogenization of the overbased material and the lower alkanol mixture is a particularly useful colloidal disperse system for incorporating into resinous compositions.

Example IV

A mixture of 1000 grams of the product of Example 12, 80 grams of methanol, 40 grams of mixed primary amyl alcohols (containing about 65% by weight of normal amyl alcohol, 3% by weight of isoamyl alcohol, and 32% of 2-methyl-1-butyl alcohol) and 80 grams of water are introduced into a reaction vessel and heated to 70° C. and maintained at that temperature for 4.2 hours. The overbased material is converted to a gelatinous mass, the latter is stirred and heated at 150° C. for a period of about 2 hours to remove substantially all the alcohols and water. The residue is a dark green, gel which is a particularly useful colloidal disperse system.

Example V

The procedure of Example IV is repeated except that 120 grams of water is used to replace the water-alkanol mixture employed as the conversion agent therein. Conversion of the Newtonian overbased material into the non-Newtonian colloidal disperse system requires about 5 hours of homogenization. The disperse system is in the form of a gel.

Example VI

To 600 parts by weight of the overbased material of Example 6, there is added 300 parts of dioctylphthalate, 48 parts of methanol, 36 parts of isopropyl alcohol, and 36 parts of water. The mixture is heated to 70°–77° C. and maintained at this temperature for 4 hours during which the mixture becomes more viscous. The viscous solution is then blown with carbon dioxide for 1 hour until substantially neutral to phenolphthalein. The alcohols and water are removed by heating to approximately 150° C. The residue is the desired colloidal disperse system.

Example VII

To 800 parts of the overbased material of Example 6, there is added 300 parts of kerosene, 120 parts of an alcohol: water mixture comprising 64 parts of methanol, 32 parts of water and 32 parts of the primary amyl alcohol mixture of Example IV. The mixture is heated to 75° C. and maintained at this temperature for 2 hours during which time the viscosity of the mixture increases. The water and alcohols are removed by heating the mixture to about 150° C. while blowing with nitrogen for 1 hour. The residue is the desired colloidal disperse system having the consistency of a gel.

Example VIII

A mixture of 340 parts of the product of Example 6, 68 parts of an alcohol:water solution consisting of 27.2 parts of methanol, 20.4 parts of isopropyl alcohol and 20.4 parts of water, and 170 parts of heptane is heated to 65° C. During this period, the viscosity of the mixture increases from an initial value of 6,250 to 54,000.

The thickened colloidal disperse system is further neutralized by blowing the carbon dioxide at the rate of 5 lbs. per hour for 1 hour. The resulting mass is found to have a neutralization number of 0.87 (acid to phenolphthalein indicator).

Example IX

The procedure of Example VIII is repeated except that the calcium overbased material of Example 6 is replaced by an equivalent amount of the cadmium and barium overbased material of Example 17. Xylene (200 parts) is used in lieu of the heptane and the further carbonation step is omitted.

Example X

A mixture of 500 parts of the overbased material of Example 6, 312 parts of kerosene, 40 parts of methyl-ethyl ketone, 20 parts of isopropyl alcohol, and 50 parts of water is prepared and heated to 75° C. The mixture is mantained at a temperature of 70–75° C. for 5 hours and then heated to 150° C. to remove the volatile components. The mixture is thereafter blown with ammonia for 30 minutes to remove most of the final traces of volatile materials and thereafter permitted to cool to room temperature. The residue is a brownish-tan colloidal disperse system in the form of a gel.

Example XI

A mixture of 500 parts of the product of Example 6, 312 parts of kerosene, 40 parts of acetone, and 60 parts of water is heated to reflux and maintained at this temperature for 5 hours with stirring. The temperature of the material is then raised to about 155° C. while removing the volatile components. The residue is a viscous gel-like material which is the desired colloidal disperse system.

Example XII

The procedure of Example XI is repeated with the substitution of 312 parts of heptane for the kerosene and 60 parts of water for the acetone-water mixture therein. At the completion of the homogenization, hydrogen gas is bubbled through the gel to facilitate the removal of water and any other volatile components.

Example XIII

To 500 parts of the overbased material of Example 9, there is added 312 parts of kerosene, 40 parts of o-cresol, and 50 parts of water. This mixture is heated to the reflux temperature (70–75° C.) and maintained at this temperature for 5 hours. The volatile components are then removed from the mixture by heating to 150° C. over a period of 2 hours. The residue is the desired colloidal disperse system containing about 16% by weight of kerosene.

Example XIV

A mixture of 500 parts of the overbased material of Example 5(a) and 312 parts of heptane is heated to 80° C. whereupon 149 parts of glacial acetic acid (99.8% by weight) is added dropwise over a period of 5 hours. The mixture is then heated to 150° C. to remove the volatile components. The resulting gel-like material is the desired colloidal disperse system.

Example XV

The procedure of Example XIV is repeated except that 232 parts of boric acid is used in lieu of the acetic acid. The desired gel is produced.

Example XVI

The procedure of Example XII is repeated except that the water is replaced by 40 parts of methanol and 40 parts of diethylene triamine. Upon completion of the homogenization, a gel-like colloidal disperse system is produced.

Example XVII

A mixture of 500 parts of the product of Example 6 and 300 parts of heptane is heated to 80° C. and 68 parts of anthranilic acid is added over a period of 1 hour while maintaining the reaction temperature between 80° and 95° C. The reaction mixture is then heated to 150° C. over a 2 hour period and blown with nitrogen for 15 minutes to remove the volatile components. The resulting colloidal disperse system is a moderately stiff gel.

Example XVIII

The procedure of Example XVII is repeated except that the anthranilic acid is replaced by 87 parts of adipic acid. The resulting product is very viscous and is the desired colloidal disperse system. This gel can be diluted, if desired, with mineral oil or any of the other materials said to be suitable for disperse mediums hereinabove.

Example XIX

A mixture of 500 parts of the product of Example 8 and 300 parts of heptane is heated to 80° C. whereupon 148 parts of glacial acetic is added over a period of 1 hour while maintaining the temperature within the range of about 80°–88° C. The mixture is then heated to 150° C. to remove the volatile components. The residue is a viscous gel which is useful for incorporation into the polymeric resins of the present invention. It may also be diluted with a material suitable as a disperse medium to facilitate incorporation into resinous compositions.

Example XX

A mixture of 300 parts of toluene and 500 parts of an overbased material prepared according to the procedure of Example 7 and having a sulfate ash content of 41.8% is heated to 80° C. whereupon 124 parts of glacial acetic acid is added over a period of 1 hour. The mixture is then heated to 175° C. to remove the volatile components. During this heating, the reaction mixture becomes very viscous and 380 parts of mineral oil is added to facilitate the removal of the volatile components. The resulting colloidal disperse system is a very viscous grease-like material.

Example XXI

A mixture of 700 parts of the overbased material of Example 5(b), 70 parts of water, and 350 parts of toluene is heated to reflux and blown with carbon dioxide at the rate of 1 cubic foot per hour for 1 hour. The reaction product is a soft gel.

Example XXII

The procedure of Example XVIII is repeated except that the adipic acid is replaced by 450 grams of di(4-methyl-amyl)phosphorodithioic acid. The resulting material is a gel.

Example XXIII

The procedure of Example XVI is repeated except that the methanol-amine mixture is replaced by 250 parts of a phosphorus acid obtained by treating with steam at 150° C. the product obtained by reacting 1,000 parts of polyisobutene having a molecular weight of about 60,000, with 24 parts of phosphorus pentasulfide. The product is a viscous brown gel-like colloidal disperse system.

Example XXIV

The procedure of Example XX is repeated except that the overbased material therein is replaced by an equivalent amount of the potassium overbased material of Example 18 and the heptane is replaced by an equivalent amount of toluene.

Example XXV

The overbased material of Example 6 is isolated as a dry powder by precipitation out of a benzene solution through the addition thereto of acetone. The precipitate is washed with acetone and dried.

A mixture of 45 parts of a toluene solution of the above powder (364 parts of toluene added to 500 parts of the powder to produce a solution having a sulfate ash content of 43%), 36 parts of methanol, 27 parts of water, and 18 parts of mixed isomeric primary amyl alcohols (described in Example IV) is heated to a temperature within the range of 70–75° C. The mixture is maintained at this temperature for 2.5 hours and then heated to remove the alkanols. The resulting material is a colloidal disperse system substantially free from any mineral oil. If desired, the toluene present in the colloidal disperse system as the disperse medium can be removed by first diluting the disperse system with mineral oil and thereafter heating the diluted mixture to a temperature of about 160° C. whereupon the toluene is vaporized.

Example XXVI

Calcium overbased material similar to that prepared in Example 6 is made by substituting xylene for the mineral oil used therein. The resulting overbased material has a xylene content of about 25% and a sulfate ash content of 39.3%. This overbased material is converted to a colloidal disperse system by homogenizing 100 parts of the overbased material with 8 parts of methanol, 4 parts of the amyl alcohol mixture of Example IV, and 6 parts of water. The reaction mass is mixed for 6 hours while maintaining the temperature at 75°–78° C. Thereafter, the disperse system is heated to remove the alkanols and water. If desired, the gel can be diluted by the addition of mineral oil, toluene, xylene, or any other suitable disperse medium.

Example XXVII

Air at the rate of 5 cubic feet per hour is blown through an overbased material of the type prepared according to Example 6 having a calcium sulfonate ash content of 44.1% while rapidly stirring it at 205° C. for 24 hours. The product, on cooling is a gel having a calcium sulfate ash content of 48.14% and a reflux base number of 368.

Example XXVIII

A colloidal disperse system of the type prepared in Example XXVII is obtained following the same technique and blowing with air for 28 hours at a temperature of 190° C.

Example XXIX

A solution of 1,000 grams of the gel-like colloidal disperse system of Example III is dissolved in 1,000 grams of toluene by continuous agitation of these two components for about 3 hours. A mixture of 1,000 grams of the resulting solution, 20 grams of water, and 20 grams of methanol are added to a 3-liter flask. Thereafter, 92.5 grams of calcium hydroxide is slowly added to the flask with stirring. An exothermic reaction takes place raising the temperature to 32° C. The entire reaction mass is then heated to about 60° C. over a 0.25 hour period. The heated mass is then blown with carbon dioxide at the rate of 3 standard cubic feet per hour for 1 hour while maintaining the temperature at 60°–70° C. At the conclusion of the carbonation, the mass is heated to about 150° C. over a 0.75 hour period to remove water, methanol, and toluene. The resulting product is a clear, light brown colloidal disperse system in the form of a gel. In this manner additional metal containing particles are incorporated into the colloidal disperse system.

At the conclusion of the carbonation step and prior to removing the water, methanol, and toluene, more calcium hydroxide could have been added to the mixture and the carbonation step repeated in order to add still additional metal-containing particles to the colloidal disperse system.

Example XXX

A mixture of 1200 grams of the gel produced according to Example III, 600 grams of toluene, and 48 grams of water is blown with carbon dioxide at 2 standard cubic feet per hour while maintaining the temperature at 55–65° C. for 1 hour. The carbonated reaction mass is then heated at 150° C. for 1.75 hours to remove the water and toluene. This procedure improves the texture of the colloidal disperse systems and converts any calcium oxide or calcium hydroxide present in the gel produced according to Example III into calcium carbonate particles.

Example XXXI

A mixture comprising 300 grams of water, 70 grams of the amyl alcohol mixture identified in Example IV above, 100 grams of methanol, and 1,000 grams of a barium overbased oleic acid, prepared according to the general technique of Example 3 by substituting oleic acid for the petrosulfonic acid used therein, and having a metal ratio of about 3.5 is thoroughly mixed for about 2.5 hours while maintaining the temperature within the range of from about 72–74° C. At this point the resulting colloidal disperse system was in the form of a very soft gel. This material was then heated to about 150° C. for a 2 hour period to expel methanol, the amyl alcohols, and water. Upon removal of these liquids, the colloidal disperse system was a moderately stiff, gel-like material.

Example XXXII

A dark brown colloidal disperse system in the form of a very stiff gel was prepared from the product of Example 39 using a mixture of 64 grams of methanol and 80 grams of water as the conversion agent to convert 800 grams of the overbased material. After the conversion process, the resulting disperse system is heated to about 150° C. to remove the alcohol and water.

Example XXXIII 1,000 grams of the overbased material of Example 40 is converted to a colloidal disperse system by using as a conversion agent a mixture of 100 grams of methanol and 300 grams of water. The mixture is stirred for 7 hours at a temperature within the range of 72–80° C. At the conclusion of the mixing, the resulting mass is heated gradually to a temperature of about 150° C. over a 3 hour period to remove all volatile liquid contained therein. Upon removal of all volatile solvents, a tan powder was obtained. By thoroughly mixing this tan powder to a suitable organic liquid such as naphtha, it is again transformed into a colloidal disperse system.

Example XXXIV

A mixture of 1000 grams of the product of Example 41, 100 grams of water, 80 grams of methanol, and 300 grams of naphtha were mixed and heated to 72° C. under reflux conditions for about 5 hours. A light brown viscous liquid material is formed which is the desired colloidal disperse system. This liquid is removed and consists of the colloidal disperse system wherein about 11.8% of the disperse medium is mineral oil and 88% is naphtha.

Following the techniques of Example III additional overbased materials as indicated below are converted to the corresponding colloidal disperse systems.

| Example No.: | Overbased material converted to colloidal disperse system |
|---|---|
| XXXV | Example 15 |
| XXXVI | Example 21 |
| XXXVII | Example 23 |
| XXXVIII | Example 24(a) |
| XXXIX | Example 28 |
| XL | Example 31 |
| XLI | Example 39 |
| XLII | Example 40 |

Example XLIII (a) A mixture comprising 80 parts water, 60 parts methanol, and 60 parts isopropanol is added to 1,000 parts of a filtrate prepared according to the general procedure of Example 2(a) and the resulting mixture is heated to reflux (about 77° C.) over a 0.5 hour period. This material is then refluxed for one hour at this temperature with vigorous mechanical stirring. At the completion of this homogenization step, the product is a gel. Approximately half of the gel is then stripped by heating and stirring at 160° C. for 1.75 hours producing a very stiff dark brown gel. The remaining portion was stripped several days later by heating at 150° C. for 1.25 hours. There is no apparent differences in the two gels.

(b) Five hundred parts of a homogenized calcium-overbased sulfonic acid salt prepared according to the general procedure of Example XLIII(a), in 250 parts toluene and 20 parts water is carbonated for about 0.75 hour. The carbonated product is then heated to 145° C. over a two-hour period to strip water and toluene from the product. The stripped product is characterized by a neutralization number (phenophthalein) of less than one (acid).

(c) The general procedure of Example XLIII(b) is repeated except that sulfur dioxide is used in lieu of carbon dioxide. After stripping is completed, the sulfur dioxide blown homogenized product is an opaque, yellowish brown viscous liquid characterized by a sulfur content of 5.48% and a calcium sulfate ash content of 39.67%.

(d) A homogenized, carbonated, calcium-overbased sulfonic acid is prepared according to the general procedure of Example 2(a) except that the mineral oil is replaced with VM and P naphtha. 1000 parts of the homogenized product thus produced, 540 parts additional parts VM and P naphtha, 100 parts water and 100 parts methanol is thoroughly mixed while heating at about 75° C. for 3 hours during which time the material becomes lighter in color, somewhat opaque, and thickens. This thickened product is then blown with carbon dioxide for 0.5 hour while the temperature is maintained at about 58°–75° C. At the end of this carbonation, the gel has a neutralization number (phenophthalein) of less than one (acid). Thereafter, the material is stripped by heating from 58° C. to 115° C. over 1.6 hours while blowing with nitrogen during which time 199 parts of water and alcohol are removed.

Example XLIV (a) A homogenized product prepared according to the general procedure of Example 3(a) is diluted with an equivalent weight of low viscosity mineral oil. Thereafter 2,500 parts of this diluted homogenized product, 232 parts calcium hydroxide, 50 parts water, 50 parts methanol, and 1,250 parts toluene is carbonated while maintaining a temperature of 50°–55° C. for 1.5 hours at which time the carbon dioxide uptake has substantially ceased. Thereafter, 942 parts additional low viscosity mineral oil is added and the resulting material is blown with nitrogen gas while heating from 50° C. to 120° C. over a two-hour period. The mass is then stripped to 160° C. and a pressure of 20 mm. (Hg) over 1.8 hours. The product is a brown viscous liquid characterized by a calcium sulfate ash content of 24.91% and a mineral oil content of 75%. This corresponds to a total metal ratio of 24.

(b) A mixture comprising 750 parts of a homogenized product produced according to the general procedure of Example 3(a), 333 parts of calcium hydroxide, 38 parts of low viscosity mineral oil, 25 parts water, 65 parts methanol, and 1,000 parts toluene is carbonated while maintaining a temperature of about 45°–50° C. for 3.75 hours at which time the carbon dioxide uptake has substantially ceased. The carbonated mass is then stripped to a temperature of 150° C. over a two-hour period. The resulting material is a very stiff tan gel, characterized by a calcium sulfate ash content of 73.95% and a total mineral oil content of about 33%. This corresponds to a metal ratio of 36.

(c) A mixture comprising 200 parts of a homogenized product produced according to the general procedure described in Example 3(a), 1,100 parts low viscosity mineral oil, 222 parts of calcium hydroxide, 100 parts of toluene, 20 parts water, and 50 parts methanol, is carbonated while maintaining a temperature of 50°–55° C. for 2.75 hours during which time an additional 20 parts water, 100 parts toluene and 50 parts methanol are added. Carbonation is continued at this same temperature for an additional three hours. Thereafter, the carbonated mass is dried by blowing with nitrogen while heating from 50° C. to 160° C. over 1.25 hours. The product is a beige liquid characterized by a sulfate ash content of 30.1% and contains a total of about 75% low viscosity mineral oil. This corresponds to a metal ratio of about 78.

Example XLV

A mixture comprising 2,000 parts of a carbonated, calcium-overbased sulfonic acid prepared according to the general procedure of Example 2(a) wherein VM and P naphtha was substituted for the mineral oil, 193 parts of mineral oil, 160 parts water, 120 parts methanol, 120 parts isopropanol, and 307 parts additional VM and P naphtha is heated at reflux for about two hours while thoroughly mixing with a mechanical mixing device. The material becomes ligher and very thick. Then, 693 parts of VM and P naphtha is added and the resulting mass is blown with carbon dioxide for about 0.5 hour during which time the homogenized product becomes substantially neutral. The carbonated mass is then stripped to a temperature of 100° C. and a pressure of 1 mm. (Hg) over a 1.5 hour period to produce a thick, dark brown gel characterized by a calcium sulfate ash content of 54%.

Example XLVI

A mixture comprising 1,000 parts of a carbonated, calcium-overbased sulfonic acid prepared according to the general procedure of Example 2(a) where VM and P naphtha is substituted for mineral oil, 500 parts additional VM and P naphtha. 150 parts water, and 150 parts of methanol are vigorously mixed while maintaining the reflux temperature for a period of about 2.5 hours. This homogenization procedure causes the material to gel. The gel is then blown with carbon dioxide for about 0.5 hour until it is substantially neutral. After carbonation, the gel is heated from 75° C. to 110° C. over three hours while blowing with nitrogen during which time 300 parts of water and methanol are removed. The gelled material is then stripped to a temperature of 100° C. and a pressure of 1 mm. (Hg) to remove 350 parts of VM and P naphtha. The resulting product is a clear brown gel.

The preparation of other non-Newtonian colloidal disperse systems useful in the compositions of this invention are disclosed in copending applications Ser. No. 535,048 filed Mar. 17, 1966, and Ser. No. 535,693 filed Mar. 21, 1966.

The change in rheological properties associated with conversion of a Newtonian overbased material into a non-Newtonian colloidal disperse system is demonstrated by the Brookfield Viscometer data derived from overbased materials and colloidal disperse systems prepared therefrom. In the following samples, the overbased material and the colloidal disperse systems are prepared according to the above-discussed and exemplified techniques. In each case, after preparation of the overbased material and the colloidal disperse system, each is blended with dioctylphthalate (DOP) so that the compositions tested in the viscometer contains 33.3% by weight DOP (Samples A, B, and C) or 50% by weight DOP (Sample D). In Samples A–C, the acidic material used in prepared the overbased material is carbon dioxide while in Sample D, acetic acid is used. The samples each are identified by two numbers, (1) and (2). The first is the overbased material—DOP composition and the second the colloidal disperse system—DOP composition. The overbased materials of the samples are further characterized as follows:

SAMPLE A

Calcium overbased petrosulfonic acid having a metal ratio of about 12.2.

SAMPLE B

Barium overbased oleic acid having a metal ratio of about 3.5.

SAMPLE C

Barium overbased petrosulfonic acid having a metal ratio of about 2.5.

SAMPLE D

Calcium overbased commercial higher fatty acid mixture having a metal ratio of about 5.

The Brookfield Viscometer data for these compositions is tabulated below. The data of all samples is collected at 25° C.

TABLE.—BROOKFIELD VISCOMETER DATA IN CENTIPOISES

| R.m.p. | Sample A | | Sample B | | Sample C | | Sample D | |
|---|---|---|---|---|---|---|---|---|
| | (1) | (2) | (1) | (2) | (1) | (2) | (1) | (2) |
| 6 | 230 | 2,620 | 80 | 15,240 | 240 | 11,320 | 114 | 8,820 |
| 12 | 235 | 2,053 | 90 | 8,530 | 230 | 6,980 | 103 | 5,220 |
| 30 | 239 | (¹) | 88 | (¹) | 224 | 4,008 | 100 | 2,892 |

¹ Off scale.

After the homogenization step, the homogenized product is suitable for preparing the solid, metal-containing compositions of this invention. It has been found advantageous to subject the homogenized product to a post-treatment whereby an acidic gas such as $CO_2$, $SO_2$, or $H_2S$, is blown through the homogenized product to reduce the residual basicity thereof. A method for achieving this neutralization is described in my U.S. Pat. 3,422,013.

To prepare the desired solid, metal-containing compositions, the metal-containing materials produced in the homogenization step must be separated from the nonpolar, inert organic diluents. This separation step can be acheived by thin-film evaporation techniques, vacuum distillaton procedures, precipitation techniques, and the like as described hereinafter.

Precipitation of the desired solid, metal-containing compositions is readily accomplished by admixing the homogenized product with a substantially inert, polar, organic liquid diluent. Upon mixing of these materials, the solid, metal-containing material precipitates and can be recovered, if desired, from the polar phase by filtration, decantation, dialysis, evaporation of the liquid, and the like. When the solid, metal-containing compositions are recovered by the precipitation procedure, they usually exist as dry powders after removal of the polar organic liquid used to precipitate them. However, when the organic diluent is removed directly by evaporation of the liquid portion of the homogenized product, the solid, metal-containing compositions tend to cake or form solids which may be powdered easily by conventional powder-making techniques such as grinding, ball-milling, etc.

If evaporation techniques such as thin-film evaporation procedures are utilized to separate the solid, metal-containing compositions from the organic liquid present in the homogenized products, the temperature should not be permitted to exceed about 350° C., preferably 300° C., in order to avoid thermal decomposition of the desired product. If evaporation procedures are used to achieve separation, the use of reduced pressures may be necessary to avoid exceeding these temperatures where the diluent is not readily removed at lower temperatures.

The substantially, inert, polar organic liquids utilized in separating the solid, metal-containing compositions from the nonpolar diluents by the precipitation technique are not critical and any polar organic liquid may be employed for this purpose as long as it does, in fact, cause the metal-containing compositions to precipitate. It is preferred that these polar diluents have boiling points at standard temperature and pressure less than 300° C. for the reason stated above, i.e., to avoid thermal decomposition if the polar liquid is removed by distillation, evaporation, etc. In fact, it is convenient to select polar organic liquids boiling at lower temperatures, e.g., less than 150° C., since this facilitates subsequent drying of the precipitate if that should be desired. It is sometimes convenient to use the polar organic liquids in admixture with nonpolar diluents such as described hereinbefore (e.g., hexane, octane, benzene, etc.) to facilitate mixing, etc. For reasons of economy, availability, ease of use, and excellent results achieved, aliphatic alcohols and ketones constitute a preferred group of polar organic liquids for precipitating the solid, metal-containing compositions with the lower alkanols and lower alkyl ketones, either symmetrical or unsymmetrical, and mixtures thereof being especially preferred. Specific examples include methanol, ethanol, n-propanol, n-butanol, n-pentanol, n-hexanol, n-heptanol, isopropyl alcohol, isobutyl alcohol, tertiary butyl alcohol, isoamyl alcohol, tertiary amyl alcohol, allyl alcohol, 2-chloroethanol, 1-chloro-2-propanol, dimethyl ketone, diethyl ketone, dipropyl ketone, dibutyl ketone, diamyl ketone, methyl ethyl ketone, methyl propyl ketone, methyl butyl ketone, methyl amyl ketone, methyl hexyl ketone, ethyl propyl ketone, chloroacetone, diacetone alcohol and the like. Alkyl ketones and alkanols of up to four carbon atoms each and mixtures thereof are particularly effective, e.g., acetone, isopropanol, and mixtures of these. Other organic liquids which can be used alone in admixture with the alcohols or ketones include dimethylformamide, dimethylacetamide, carbon tetrachloride, trichloro benzenes, diethyl ether of ethylene glycol, diethyl ether, dioxane, and the like. While pentane is not a polar organic liquid, it also possesses the ability to cause most of the solid, metal-containing composition to precipitate from the homogenized products.

When employing the precipitation technique, the organic polar liquid and the homogenized product are mixed in a weight ratio of polar liquid to homogenized product of about 0.5:1 to 20:1. Better separation is achieved in most instances, however, if the minimum ratio is at least about 1.5:1. Generally, there is no advantage in exceeding a ratio of about 10:1. Precipitation normally commences as soon as the polar liquid and homogenized products are mixed, even at ambient temperature. Cooling may be employed to increase the efficiency of separation. After precipitation, the precipitated solid, metal-containing compositions can be recovered by filtration, centrifugation, and other conventional means.

The following examples illustrate the separation processes of the present invention. The solid, metal-containing compositions produced by these processes are illustrative of the products of this invention. As used in these examples and elsewhere in the specification, "percentages" and "parts" refer to percent by weight and parts by weight unless otherwise specified.

Example A (a) Xylene is added to a post-carbonated homogenized product prepared according to the general procedure of Example XLIII(b) in an amount sufficient to provide a weight ratio of homogenized product to xylene of 70:30. A mixture comprising 1,333 parts of the xylene diluted homogenized product, 667 parts toluene, 185 parts calcium hydroxide, 40 parts methanol, and 40 parts water is carbonated for two hours while maintaining a temperature of 50° C. to 70° C. At the end of this time, the carbonated mixture is slightly acidic. The carbonated mixture is then heated from 70° C. to 120° C. over a 2.5 hour period to remove water and methanol. The resulting mixture is a pale brown liquid solution of the diluted homogenized calcium-over-based sulfonic acid salts which is now characterized by a metal ratio of about 24.

(b) One hundred parts of the product of Example A(a) is added at room temperature to 200 parts of acetone. The desired solid, calcium-containing composition precipitates. After settling for 0.5 hour, the liquid portion is decanted. Then an additional 100 parts of acetone are added to the precipitate and again the whole is allowed to stand for 0.5 hour. The liquid is again decanted and an additional 100 parts of xylene is added with stirring. The precipitate settles over a 0.5 hour period and recovered by filtration. The solid filtered material is dried in an oven for two hours producing a beige powder characterized by a calcium carbonate content of 73.6%. Analysis of the acetone washings establishes that there are 15.4 parts of oil in the first, 5.2 parts in the second, and 2.8 in the third.

(c) Five hundred parts of the product produced according to Example A(a) is added to 1,000 parts of acetone at room temperature. The desired solid, calcium-containing composition precipitates and is filtered. The filter cake is then dissolved in 190 parts of 1,1,1-trichloroethane to produce a dark brown opaque liquid which consists essentially of about 36% of the desired precipitated micellar complex, 29% acetone, and 34% 1,1,1-trichloroethane.

(d) Five hundred parts of the diluted product of Example A(a) is added to 1,000 parts of acetone at room temperature. The desired calcium-containing composition precipitates and is recovered by filtration and dried. The dried product is a beige powder containing 1.47% sulfur, and 69.8% calcium carbonate.

Example B (a) A mixture comprising 500 parts of isopropanol and 1,500 parts of a product prepared according to the general procedure of Example XLIII(b) is heated to about 60° C. and added to a flask containing 4,000 parts of isopropanol. A beige precipitate forms immediately as the first formed mixture is added to the isopropanol. The resulting mixture is stirred for about 0.25 hour and the liquid phase is decanted. The precipitate is then dried in an oven for 72 hours at 130° C. The product is a hard brown solid which can be easily reduced to a powder by ball milling or other types of grinding. The solid is characterized by a calcium sulfate ash content of 68.4%, a $CO_2$ content of about 18.6%, and a sulfur content of 2.18%.

(b) Five hundred parts of the homogenized product prepared according to the general procedure of Example XLIII(b) is added to 1,500 parts of isopropanol and mixed for 0.5 hour at room temperature. This mixture is then centrifuged and the thus isolated calcium-containing composition placed in an oven and dried for three hours at 50° C. The resulting material is the desired micellar complex in the form of a solid brown material containing 23.8% calcium.

Example C (a) A post-carbonated homogenized product prepared according to the general procedure of Example XLIII(b) is diluted with xylene in an amount sufficient to provide a 70:30 weight ratio of homogenized product to xylene. Subsequently, 2,500 parts of this mixture is added at room temperature to a previously prepared mixture of 6,250 parts each of acetone and isopropanol. The desired calcium-containing composition precipitates immediately and is allowed to settle over a two-hour period. Most of the liquid is removed from the precipitate by decantation and the remainder is thereafter removed by drying in a vacuum oven. The final product is a dark brown easily powdered solid.

(b) To a mixture comprising 2,100 parts each of acetone and isopropanol is added 1,066 parts of the diluted homogenized product described in Example C(a) above and mixed for about 0.75 hour. The precipitate which forms is then allowed to settle and most of the liquid layer is subsequently removed by decantation. The precipitate is filtered producing 530 parts of wet filter cake. Then 265 parts of the wet filter cake is dried in a vacuum oven producing 166 parts of dry material which is pebble-milled to produce a fine, light-brown powder which is the desired calcium-containing composition. The powder is characterized by a calcium content of 24.1% and a sulfur content of 2.2%.

The remaining half of the filter cake (containing about 37% liquid solvent is mixed with 289 parts of 1,1,1-trichloroethane to produce a 30% solution of the desired calcium-containing composition.

(c) A mixture comprising 500 parts of a homogenized material prepared according to the general procedure of Example XLIII(b) and 1,500 parts of acetone is mixed for 0.5 hour at room temperature during which time a precipitate forms. The liquid layer is then removed by decantation and 1,500 parts of isopropanol are added for an additional 0.5 hour. Again the liquid layer is decanted and the precipitate is recovered by filtration and thereafter dried by heating for three hours at 50° C. in a vacuum. The product is a brown powder characterized by a calcium content of 25.7%.

(d) A mixture comprising 2,000 parts of a homogenized product prepared according to the general procedure of Example XLIII(b) and 6,000 parts acetons is stirred for 0.5 hour at which time 2,000 additional parts of acetone are added and stirring is continued for 0.25 hour. Most of the liquid layer is then removed by decantation and 6,000 parts of isopropanol are thereafter added to the precipitate and mixed for 0.5 hour. Again, the liquid layer is removed by decantation and the precipitate recovered by filtration. The filtrate is dried in a vacuum oven at 50° C. and the dried material is ball-milled. The product is a fine beige powder characterized by a sulfur content of 2.4% and a calcium content of 24.7%.

(e) To a mixture comprising 1,000 parts hexane and 4,000 parts of acetone there is added 1,000 parts of a xylene-diluted post-carbonated homogenized product prepared according to the procedure of Example XLIII(b) (diluted with xylene to produce a weight ratio of homogenized product to xylene of 70:30). This mixture is stirred for about ten minutes at room temperature and thereafter the precipitate which formed almost immediately is allowed to settle for 0.5 hour. Then, 3,984 parts of liquid is removed by decantation, 2,000 parts acetone and 500 parts hexane is added and mixed with the precipitate. After allowing the precipitate to settle, 2,383 parts of liquid are decanted and 2,000 parts of acetone, and 500 parts hexane are added to the precipitate. After stirring and settling, 2,849 parts of liquid are removed by decantation. Then 800 parts of 1,1,1-trichloroethane are added to the precipitate and the resulting mixture is heated on a waterbath maintained at a temperature of about 80° C. while blowing with nitrogen to produce a clear, dark brown viscous liquid solution of the desired calcium-containing composition comprising about 51% 1,1,1-trichloroethane and about 6–7% of a mixture of acetone and hexane.

Example D

A Soxhlet extracter thimble is filled with 100 parts of a post-carbonated homogenized material prepared according to the general procedure of Example XLIII(b). It is thereafter extracted for 48 hours with refluxing hexane. The desired calcium-containing composition remains in the thimble and is dried for three hours at 50° C. in a vacuum oven. A light brown powder characterized by a calcium content of 24.2% is thus produced.

Example F (a) A mixture comprising 1,500 parts of a carbonated, calcium-overbased sulfonic acid prepared according to the general procedure of Example 44(a) (except the mineral oil was replaced with VM and P naphtha), 120 parts water, 90 parts methanol, and 90 parts isopropanol is homogenized by thoroughly mixing while heating at the reflux temperature (about 75° C.) during which time the mixture thickens and finally is transformed into a light brown gel. This gelled material is then dried in an oven at about 143° C. for nine hours. The dried, calcium-containing composition is then powdered in a mortar. This powder is characterized by a calcium sulfate ash content of 68.7% and a $CO_2$ content of about 18.32%.

(b) The general procedure of Example F(a) is repeated substituting 2,000 parts of the same carbonated, calcium-overbased sulfonic acid salt, 160 parts water, 120 parts methanol and 120 parts isopropanol. The mixture is heated under reflux conditions for about one hour with thorough mixing during which time a light brown gelled material forms. This gel is spread evenly over two trays and dried in an oven for eighteen hours at 80° C. and two hours at 130° C. After drying it is crushed in a mortar to produce a brown powder characterized by a calcium sulfate ash content of 66.48%, a sulfur content of 2.83%, and a $CO_2$ content of 18.1%.

(c) The procedure of Example F(b) above is repeated but the gel material is dried by spreading on a tray and drying for three days at room temperature. After drying the material is powdered, the powder being characterized by calcium content of 18%.

(d) Five hundred parts of the homogenized product prepared according to the general procedure of Example XLIII(b) and 167 parts of xylene are thoroughly mixed for one-half hour. This mixture is deposited on steel panels in about four-mil thick layers and heated in a drying oven at a temperature of between 300°–315° C. for five minutes. The panels are then removed and the solid deposit scraped therefrom. The desired calcium-containing compositions formed in this manner are in the form of a brown, flaky powder characterized by a sulfur content of about 3% and a calcium content of about 22.6%.

Example F (a) The carbonated, calcium overbased carboxylic acid mixture produced according to the procedure of Example 43(b) is homogenized according to the general procedure set forth in Example XLIII(a). The homogenized product is thereafter treated with acetone according to the general procedure of Example D(d) to precipitate the desired calcium-containing composition. The precipitate is subsequently recovered by filtration and dried in a vacuum oven.

(b) The procedure of Example F(a) above is repeated substituting the carbonated, calcium-overbased organic acid mixture produced according to the procedure of Example 44(b) above for that of Example 43(b).

Example G

The homogenized product of Example II is processed according to the general procedure of Example A(b) to produce a barium-containing composition according to this invention.

Example H

The homogenized product of Example XXXVI is processed according to the general procedure of Example A(c) to produce a barium-containing composition according to this invention.

Example I

The general procedure of Example B(b) is applied to the homogenized product of Example XXXVII to produce another barium-containing composition of this invention.

Example J

The homogenized product of Example XXXVIII is processed according to the general procedure of Example C(a) to produce a solid, barium-containing composition according to this invention.

Example K

Following the general procedure of Example C(a), the homogenized product of Example XXXIX is treated with acetone and isopropanol to isolate the desired barium-containing precipitate.

Example L

The homogenized product of Example XL is processed according to the general procedure of Example C(a) to isolate the desired solid, metal-containing composition.

Example M

An overbased product prepared according to the procedure of Example 19 is homogenized according to the general procedure of Example I. The homogenized product is then mixed with three times its weight of acetone to precipitate the desired metal-containing composition.

Example N

The overbased amine-aldehyde condensation product of Example 29 is homogenized according to the general procedure of Example II. Then the homogenized product is processed according to the process described in Example B(b) to precipitate the desired metal-containing composition.

Example O

The strontium-overbased material of Example 33 is homogenized according to the general procedure of Example III and the desired solid, strontium-containing composition isolated according to the procedure of Example B(a).

Example P

The procedure of Example O is repeated substituting the overbased product of Example 35 for that of Example 33.

Example Q

The lithium-conating overbased product of Example 36(b) is homogenized according to the general procedure of Example IV. The desired solid, lithium-containing composition is prepared by heating the homogenized product in an oven at 100 mm. (Hg) pressure for fifteen hours.

The foregoing examples are illustrative specific embodiments of this invention. Obviously, these processes can be varied in accordance with the general description of the invention presented in detail hereinbefore. Likewise, as will be apparent to those skilled in the art; other specific embodiments of the invention are readily available by replacing all or a portion of those materials used in the foregoing examples with other equivalent materials as described hereinbefore. For example, the acetone employed in some of the foregoing examples can be replaced with other equivalent ketones such as methyl ethyl ketone or a portion of the acetone can be replaced by methyl ethyl ketone or some other ketone. Likewise, the isopropanol can be replaced by ethanol, methanol, isobutanol, etc., or mixtures of these. The calcium-overbased carboxylic and sulfonic acids employed can be replaced with other overbased organic materials as described and illustrated herein. In making these replacements or substitutions, the substituting material is substituted on an equivalent basis or within the general parameters described hereinabove.

The solid, metal-containing compositions of this invention are readily and stably dispersible in nonpolar organic liquids simply by admixing them with such liquids at room temperature. This is a very important characteristic of these solid, metal-containing compositions and, as suggested above, makes them particularly useful for incorporating metal-containing materials into plastics, paints, rubbers, caulks, and the like. This dispersibility greatly facilitates the homogeneous dispersion of the metal-containing compositions throughout the organic material to which it is added. Furthermore, dispersing these solid, metal-containing compositions into organic diluents prior to incorporating them into various plastics, paints, caulks, rubbers, and the like further facilitates handling and mixing in many instances. For example, the solid, metal-containing composition can be dissolved in 1,1,1-trichloroethane and the resulting solution added to a plastic or rubber material. After mixing is accomplished, the 1,1,1-trichloroethane can be removed by evaporation. Similarly, the solid, metal-containing compositions can be stably dispersed in other organic liquids, particularly nonpolar organic liquid diluents such as benzene, normally liquid halogenated hydrocarbons and hydrocarbons, e.g., hexane, cyclohexane, 1,1,2-trichloroethane, 1,1,2-tribromoethane, 1,1,2,2-tetrachloroethane, chlorobenzene, toluene, xylene, nonane, and the like, to assist in mixing and handling them. In many instances, liquids which can be easily removed by evaporation such as 1,1,1-trichloroethane are preferred since they facilitate mixing and handling but can be removed easily at a later time. They also can be used effectively in their dried, powdered form. In fact, their ready dispersibility in that form makes them ideally suited for applications where the presence of volatile organic liquid carriers is undesirable.

The solid, metal-containing compositions of the invention will be used primarily as fillers and modifiers of rheological properties in the paints, caulks, plastics, and so forth in which they are employed. While the optimum amount for any given application will depend upon the particular solid, metal-containing composition and the specific application involved, the solid, metal-containing compositions will generally be employed in those amounts which will prove a metal-content equal to the metal-content utilized when conventional metal-containing fillers and thixotropes (e.g., calcium carbonate) are added to these materials. For example, in making polyester molded laminates, the solid, metal-containing compositions can be employed in amounts that will provide from about 25% to about 50% by weight of the total weight of the mix. When so incorporated, the solid, metal-containing composition lowers the pound-volume cost, improves surface smoothness and hardness, increases heat resistance, impact and flexural strength, and reduces mold shrinkage. They are useful as additives in conventional polyester gel coats because of their excellent dispersibility. In this application they can be used in amounts up to that which provides about 25% by weight solid, metal-containing composition based on the total weight of the polyester mix. The solid, metal-containing compositions can be employed in conventional epoxy adhesives in amounts that provide from about 5% to about 50% by weight solid, metal-containing composition based on the total weight of the adhesive. The phenolic resins, heat resistance and impact strength are improved, mold shrinkage decreased, and cost is reduced. When used in phenolics, the amount added usually provides 30%–70% by weight of solid, metal-containing composition in the total composition. In polyurethane foams, amounts of from about 10% to about 50% by weight of the total weight of urethane foam will be used. In this application, compositions decrease the cost of the material, lower compressibility, and contribute to a more uniform cell structure. In polyethylene and polypropylene plastics, the compositions add strength, opacity, hardness, and reduce costs. They are likewise useful as additives for polyvinyl chloride resins where they function as fillers and thixotropic agents. When added to polysulfide caulks and sealants, they improve the rheological properties.

Another use for the solid, metal-containing compositions of this invention is in the preparation of thickened lubricating oils derived from either natural or synthetic base stocks by mixing the complexes with the base stocks. The metal-containing compositions are capable of thickening these base stocks to viscous liquids or greases, depending on the amount of metal-containing composition employed. The thickened liquids and greases can be used as lubricants and as protective coatings for metal surfaces to protect against oxidation and corrosion.

To illustrate this thickening capability, a solid, metal-containing composition prepared by precipitating such a solid complex from the stripped product of Example XLIII(b) by mixing the stripped product with acetone and hexane in a weight ratio of about 1:4.5:1.1 to precipitate the desired solid. After separating but without drying the precipitated solid, it is dissolved in 1,1,1-trichloroethane, the weight ratio of precipitate to solvent being about 1:0.95. The resulting solution is then used to prepare thickened synthetic oils as described below.

(a) A grease is prepared by mixing 400 parts of Emery 0711 synthetic oil (polyester type) with 1,150 parts of the above-described 1,1,1-trichloroethane solution for ten minutes in a doublearm day mixer and thereafter subjecting the mixture to a vacuum (20 mm. Hg) for 1.5 hours. The resulting mixture is then heated at about 82° C. for about 2 hours. The heat-treated mixture is a grease which is improved insofar as stiffness or penetration is concerned by milling in a Trihomodisoperse-homogenizer mill with rotor-stator clearance of 0.001 inch.

(b) Following the general procedure of (a) immediately above, additional greases were prepared from other synthetic base stocks by mixing and milling the indicated base stocks with the above-described 1,1,1-trichloroethane solution in a weight ratio of 250:716.

Synthetic Base Stocks Employed (1) Synthetic hydrocarbon oil BBM 230 available from Monsanto Chemcial Company.
(2) Tri-(2-ethylhexyl)-phosphate available as Flexol TUF from Union Carbide.
(3) Polyglycol ether available as UCON LB–300X from Union Carbide Corporation.

When prepared in the foregoing manner, the final greases contain approximately 50% by weight of the synthetic base stock. By serial dilution of these greases with additional base stock, greases containing 65% and 75% by weight of synthetic base stock are prepared.

Grease-making techniques are well-known in the art and no further discussion thereof is appropriate herein. By substituting other solid metal-containing compositions of the type described herein for the one used in the foregoing grease-making examples and/or by replacing the synthetic base stocks employed in those examples with other such base stocks, additional greases can be readily prepared.

In some of the foregoing applications, the presence of oil is undesirable. For example, in the preparation of epoxy adhesives, oil may interfere with the desired adhesive qualtities particularly if it migrates to the interface of the adhering surfaces. In these applications, solid, metal-containing compositions can be utilized which were prepared by oil-free processes or from which the oil has been substantially removed or reduced as the particular application requires through washing or extracting with organic solvents for oil, etc. However, as those metal-containing compositions which are formed from overbased organic materials prepared and/or homogenized in the presence of mineral oil appear to be the ones which are most easily and stably dispersed, it is usually desirable that the overbased organic materials be prepared and/or homogenized in the presence of mineral oil even if a particular application requires a substantially mineral oil-free metal-containing composition. The oil can be removed from the composition by precipitation with subsequent washing, solvent extraction, and the other techniques discussed above.

What is claimed is:

1. A process for preparing solid, metal-containing compositions, wherein the metal is selected from the group consisting of Group I and Group II, comprising homogenizing at least one overbased organic acid having Newtonian properties and a metal ratio of at least 3 which is homogeneously dispersed ih a substantially inert, nonpolar organic liquid diluent in the presence of at least one conversion agent selected from the group consisting of lower aliphatic carboxylic acids, water, aliphatic alcohols, cycloaliphatic alcohols, arylaliphatic alcohols, phenols, ketones, aldehydes, amines, boron acids, phosphorus acids, oxygen, air, and carbon dioxide for a time sufficient to give non-Newtonian properties, and thereafter separating from the resulting homogenized product substantially al lof the nonpolar organic liquid diluent, conversion agent, and water from the remainder of the reaction mixture thereby isolating the desired solid, metal-containing composition, wherein the proportion of the conversion agent in the homogenization step is from about 1% to about 80% based upon the weight of the overbased organic acid salt excluding the weight of the inert, organic diluents and any promoter remaining.

2. The process according to claim 1 wherein the overbased organic acid is at least one carbonated, alkaline earth metal overbased organic acid wherein the organic acid is selected from the group consisting of phosphorus acids, thiophosphorus acids, sulfur acids, carboxylic acids, and thiocarboxylic acids characterized by the presence of at least twelve aliphatic carbon atoms within its structure.

3. The process according to claim 1 wherein the separating step is accomplished by mixing the homogenized product with at least one substantially inert polar organic liquid to precipitate the desired solid, metal-containing composition.

4. The process according to claim 4 wherein the polar organic liquid is selected from the class consisting of ketones and alcohols.

5. The process according to claim 1 where the separation step is accomplished by evaporating substantially all of the diluent, conversion agents, and water from the homogenized product.

6. The process according to claim 5 where evaporation is accomplished at subatmospheric pressure.

7. The product of the process of claim 1.

8. The product of the process of claim 7.

9. A substantially stable dispersion comprising at least one nonpolar substantially inert organic liquid diluent and from about 10% to about 80% by weight of solid, metal-containing compositions according to claim 7 prepared by admixing the requisite amount of said complex with said at least one substantially inert organic liquid diluent.

10. A substantially stable dispersion comprising at least one nonpolar substantially inert liquid diluent in which there has been stably dispersed from about 10% to about 80% by weight of solid, metal-containing compositions according to claim 7 prepared by admixing the requisite amount of said metal-containing compositions with said at least one nonpolar substantially inert organic liquid diluent.

11. A composition according to claim 10 wherein said inert organic liquid diluent is 1,1,1-trichloroethane.

References Cited

UNITED STATES PATENTS

| | | | |
|---|---|---|---|
| 2,763,615 | 9/1956 | Faust | 252—33 |
| 3,543,124 | 7/1969 | Wurstner | 252—33 |
| 3,372,114 | 3/1968 | Reuse | 252—33 |
| 3,422,013 | 1/1969 | Scher | 252—33 |
| 3,410,801 | 11/1968 | Funkel et al. | 252—33 |
| 3,436,347 | 4/1969 | Otto et al. | 252—33 |
| 3,384,586 | 5/1968 | McMillen | 252—33 |
| 3,492,231 | 1/1970 | McMillen | 252—33 |
| 3,377,283 | 4/1968 | McMillen | 252—33 |
| 3,242,079 | 3/1966 | McMillen | 252—33 |

DANIEL E. WYMAN, Primary Examiner

I. VAUGHN, Assistant Examiner

U.S. Cl. X.R.

106—288 B, 306; 252—32.5, 33, 33.4, 39; 260—37, 38, 40, 41

UNITED STATES PATENT OFFICE
CERTIFICATE OF CORRECTION

Patent No. 3,766,066                    Dated October 16, 1973

Inventor(s) Richard Leo McMillen

It is certified that error appears in the above-identified patent and that said Letters Patent are hereby corrected as shown below:

At column 45, line 19, that is Claim 1, line 4, "ih" should be --in--.

At column 45, line 28, that is Claim 1, line 7, "al lof" should be --all of--.

At column 45, line 48, that is Claim 4, line 1, "claim 4" should be --claim 3--.

At column 46, line 8, that is Claim 8, cancel the line (that is, Claim 8).

Signed and sealed this 19th day of March 1974.

(SEAL)
Attest:

EDWARD M. FLETCHER, JR.
Attesting Officer

C. MARSHALL DANN
Commissioner of Patents